US010055315B2

(12) United States Patent
Lu

(10) Patent No.: US 10,055,315 B2
(45) Date of Patent: Aug. 21, 2018

(54) FAILURE MONITORING IN DISTRIBUTED COMPUTING SYSTEMS

(71) Applicant: Microsoft Technology Licensing, LLC, Redmond, WA (US)

(72) Inventor: Xun Lu, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 18 days.

(21) Appl. No.: 15/197,335

(22) Filed: Jun. 29, 2016

(65) Prior Publication Data

US 2018/0004611 A1    Jan. 4, 2018

(51) Int. Cl.
G06F 11/07     (2006.01)
G06F 11/18     (2006.01)
H04L 12/721    (2013.01)

(52) U.S. Cl.
CPC .............. *G06F 11/18* (2013.01); *H04L 45/14* (2013.01); *G06F 2201/805* (2013.01)

(58) Field of Classification Search
CPC ....... G06F 11/1425; G06F 11/18; G06F 11/20
USPC ...................................... 714/2, 21
See application file for complete search history.

(56) References Cited

U.S. PATENT DOCUMENTS

| | | | |
|---|---|---|---|
| 6,192,483 B1 | 2/2001 | Moiin et al. | |
| 6,401,120 B1 | 6/2002 | Gamache et al. | |
| 6,760,736 B2 | 7/2004 | Waldo et al. | |
| 6,775,703 B1 * | 8/2004 | Burns | G06F 12/0866 709/223 |
| 7,190,961 B2 | 3/2007 | Burr | |
| 7,277,952 B2 | 10/2007 | Nishanov | |
| 7,890,663 B2 | 2/2011 | Millet | |
| 8,560,747 B1 * | 10/2013 | Tan | G06F 9/526 710/200 |
| 9,026,843 B2 | 5/2015 | Kaufmann et al. | |
| 9,037,899 B2 | 5/2015 | Bae et al. | |
| 9,063,787 B2 | 6/2015 | Lee et al. | |
| 9,081,654 B2 * | 7/2015 | Xun | H04L 69/40 |
| 9,146,794 B2 | 9/2015 | Xun et al. | |
| 9,258,244 B1 | 2/2016 | Boyd et al. | |
| 9,742,692 B2 | 8/2017 | Murthy | |
| 2003/0214962 A1 | 11/2003 | Allaye-Chan et al. | |

(Continued)

FOREIGN PATENT DOCUMENTS

CN         104133744 A    11/2014

OTHER PUBLICATIONS

Chen, et al., "Quorum-Based Perfect Failure Detection Service", In Technical Report MSR-TR-2009-62, May 2009, pp. 1-12.

(Continued)

*Primary Examiner* — Chae M Ko
(74) *Attorney, Agent, or Firm* — Liang IP, PLLC

(57) ABSTRACT

Arbitration techniques in distributed computing systems are disclosed herein. In one embodiment, a method includes receiving an arbitration request from a first node in the computing system. The first arbitration request indicating that a one-way lease between the first node and a second node in the computing system has failed. The method also includes in response to receiving the arbitration request from the first node, providing an arbitration result to the first node, the arbitration result allowing both the first and second nodes to continue to operate despite of that the one-way lease between the first and second nodes has failed.

20 Claims, 21 Drawing Sheets

(56) References Cited

U.S. PATENT DOCUMENTS

| | | |
|---|---|---|
| 2008/0010282 A1 | 1/2008 | Douceur |
| 2011/0238842 A1 | 9/2011 | Massa et al. |
| 2013/0254599 A1 | 9/2013 | Katkar |
| 2014/0095930 A1* | 4/2014 | Xun .................... H04L 41/0645 714/25 |
| 2014/0208173 A1 | 7/2014 | Xun et al. |
| 2017/0094003 A1 | 3/2017 | Gahlot |

OTHER PUBLICATIONS

Parameswaran, et al., "Arbitration-based Reliable Distributed Mutual Exclusion for Mobile Ad-hoc Networks", In Proceedings of 11th International Symposium on Modeling & Optimization in Mobile, Ad Hoc & Wireless Networks, May 13, 2013, 8 pages.

Office Action issued in U.S. Appl. No. 15/197,350, dated Feb. 9, 2018, 19 pages.

Office Action issued in U.S. Appl. No. 15/197,350, dated May 15, 2018, 18 pages.

Notice of Allowance issued in U.S. Appl. No. 15/197,350, dated Jun. 26, 2018, 8 pages.

* cited by examiner

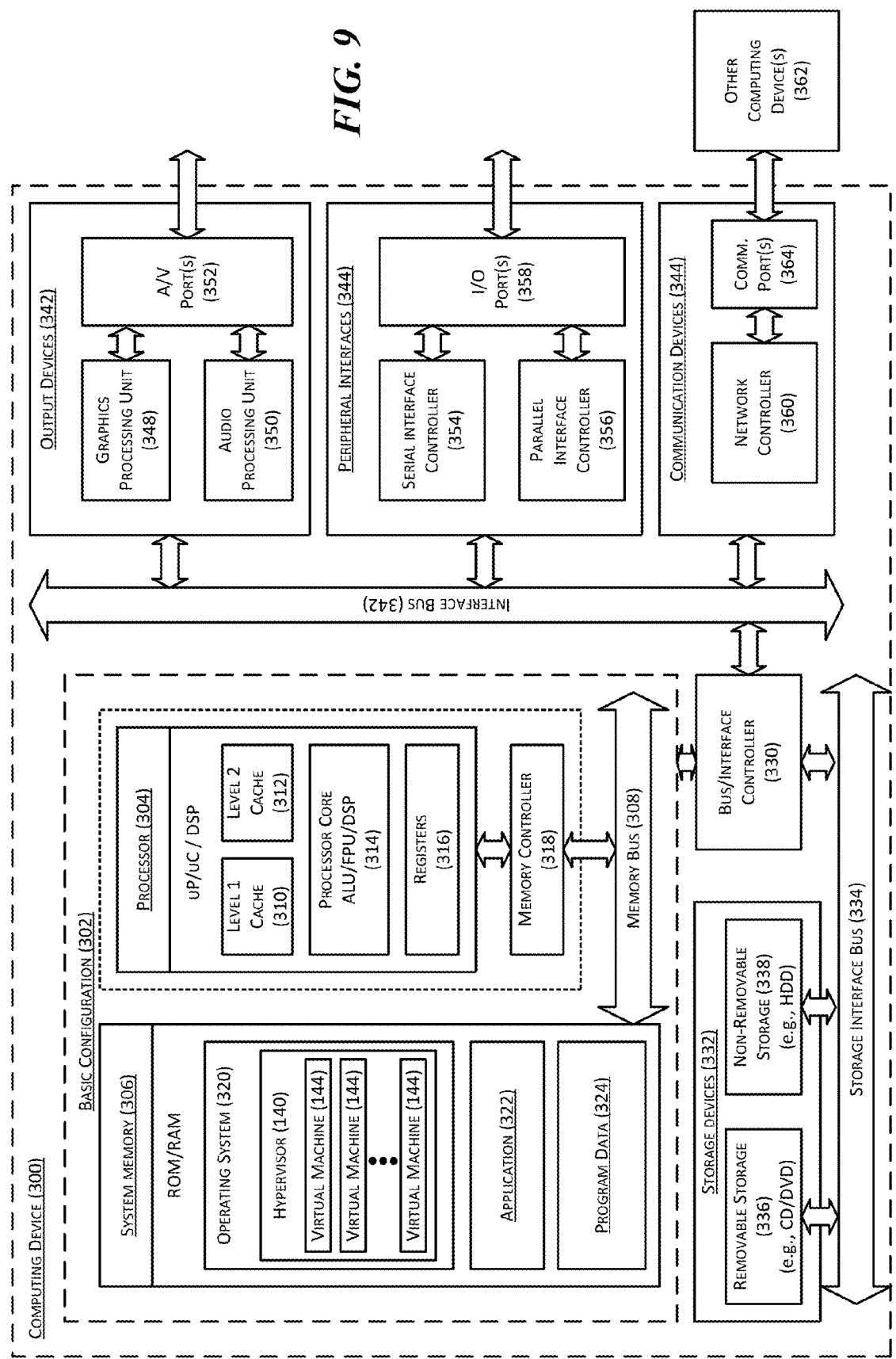

FAILURE MONITORING IN DISTRIBUTED COMPUTING SYSTEMS

BACKGROUND

Distributed computing systems such as datacenters and other computing systems typically include routers, switches, bridges, and other physical network devices that interconnect a large number of servers, network storage devices, and other types of nodes via wired or wireless network links. The individual nodes can host one or more virtual machines or other types of virtualized components accessible to cloud computing clients. The virtual machines can exchange messages such as emails via virtual networks in accordance with one or more network protocols supported by the physical network devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Distributed computing systems typically include a large number of nodes interconnected by a computer network to provide computation, communications, or other types of cloud services. Such distributed computing systems often use lease protocols for failure monitoring and detection. A lease generally refers to a relationship between a pair of nodes established via exchange of periodic messages between the pair of nodes.

Using such leases, one node can detect failure of another node. For example, a first node acting as a subject can send periodic renewal requests to a second node as a monitor. If a proper renewal request is received from the first node, the second node can renew the lease by transmitting a renewal response to the first node and inferring that the first node is operating normally. Such a lease scenario is often referred to as a one-way lease. In other examples, the second node can also act as a subject while the first node acts as a monitor for the second node. As such, the lease between the first and second nodes can be referred to as a two-way lease.

Under certain conditions, the foregoing failure detection scheme can cause nodes to terminate prematurely or unnecessarily, and thus causing a reduction in processing, storage, or other types of resources in distributed computing systems. In a two-way lease example, when communications between the first and second nodes is lost due to network congestion or failure, both the first and second nodes can transmit an arbitration request to an arbitrator. The arbitrator, however, would allow only one of the first or second node to continue to operate or to "live" based on, for example, prior arbitration history and/or whose arbitration request arrives at the arbitrator first. Thus, even when the network congestion or failure can be remedied quickly, the arbitration process would lead to at least one of the first or second node to terminate, and thus reduce capacity in the distributed computing system. Similarly, in the one-way lease example above, communications between the first and second nodes may be temporarily lost due to network congestion or failure. However, if the one-way lease is lost, the first node as a subject would be terminated even though the first node may be operating normally otherwise.

Several embodiments of the disclosed technology can at least ameliorate some drawbacks of the foregoing failure detection scheme. For two-way leases, several embodiments of the disclosed technology can utilize delay and neutral arbitration results to allow both the first and second nodes to continue to operate. For example, the first and second nodes can send first and second arbitration requests, respectively, to an arbitrator when a two-way lease between the first and second nodes is lost. When the arbitrator receives the first arbitration request, unlike in other arbitration schemes, the arbitrator can neither grant nor reject the first arbitration request from the first node. Instead, the arbitrator can issue a delay arbitration result to the first node allowing the first node to continue to operate. The arbitrator would wait for the second arbitration request to arrive from the second node. If the second arbitration request does not arrive within a preset waiting period, the arbitrator can grant the first arbitration request by issuing a positive arbitration result to the first node, and inferring that the second node has failed and is to be terminated. On the other hand, if the second arbitration request arrives within the waiting period, the arbitrator can issue a neutral arbitration result to both the first and second nodes, allowing both the first node and the second node to continue to operate.

In other embodiments of the disclosed technology, a subject node can be in a one-way lease with a monitor node. Once the subject node detects that the one-way lease with the monitor node is lost, for example, due to a communications loss with the monitor node, the subject node can transmit an arbitration request to an arbitrator. In response, the arbitrator can allow the subject node to continue to operate by issuing a neutral arbitration result to the subject node. However, the neutral arbitration result issued to the subject node would not lead to the monitor node to be terminated.

In the foregoing one-way lease example, the monitor node can also send an arbitration request to the arbitrator when the one-way lease with the subject node is lost. If the arbitration request from the monitor node is granted, for example, when no arbitration request from the subject node is received in time, the subject node is to be terminated. Even if the arbitration request from the monitor node is not granted (e.g., another arbitration request has been received from the subject node), the arbitrator can allow the monitor node to continue to operate normally by issuing a neutral arbitration result to the monitor node. In further embodiments, the monitor node can ignore the failed one-way lease with the subject node and continue operation normally without sending the arbitration request to the arbitrator regarding the lost one-way lease.

Several embodiments of the disclosed technology can reduce or limit premature or unnecessary termination of nodes in distributed computing systems by allowing time for the first or second arbitration request to reach the arbitrator by utilizing delay and/or neutral arbitration results. Typically, in distributed computing systems, even when sent simultaneously by the first and second nodes, the first and second arbitration requests can still arrive at the arbitrator at different times due to network traffic conditions, network routes, or other reasons. Thus, one of the first or second arbitration request would likely arrive before the other at the arbitrator. Instead of causing at least one of the first or second node to terminate in arbitration, several embodiments of the disclosed technology can allow both the first and second nodes to live if the first and second arbitration requests arrive at the arbitrator within the preset waiting period, and thus preventing or at least lowering reduction of capacity in distributed computing systems when compared to other arbitration schemes.

BRIEF DESCRIPTION OF THE DRAWINGS

FIG. 9 is a computing device suitable for certain components of the distributed computing system in FIG. 1.

DETAILED DESCRIPTION

Figure 1:
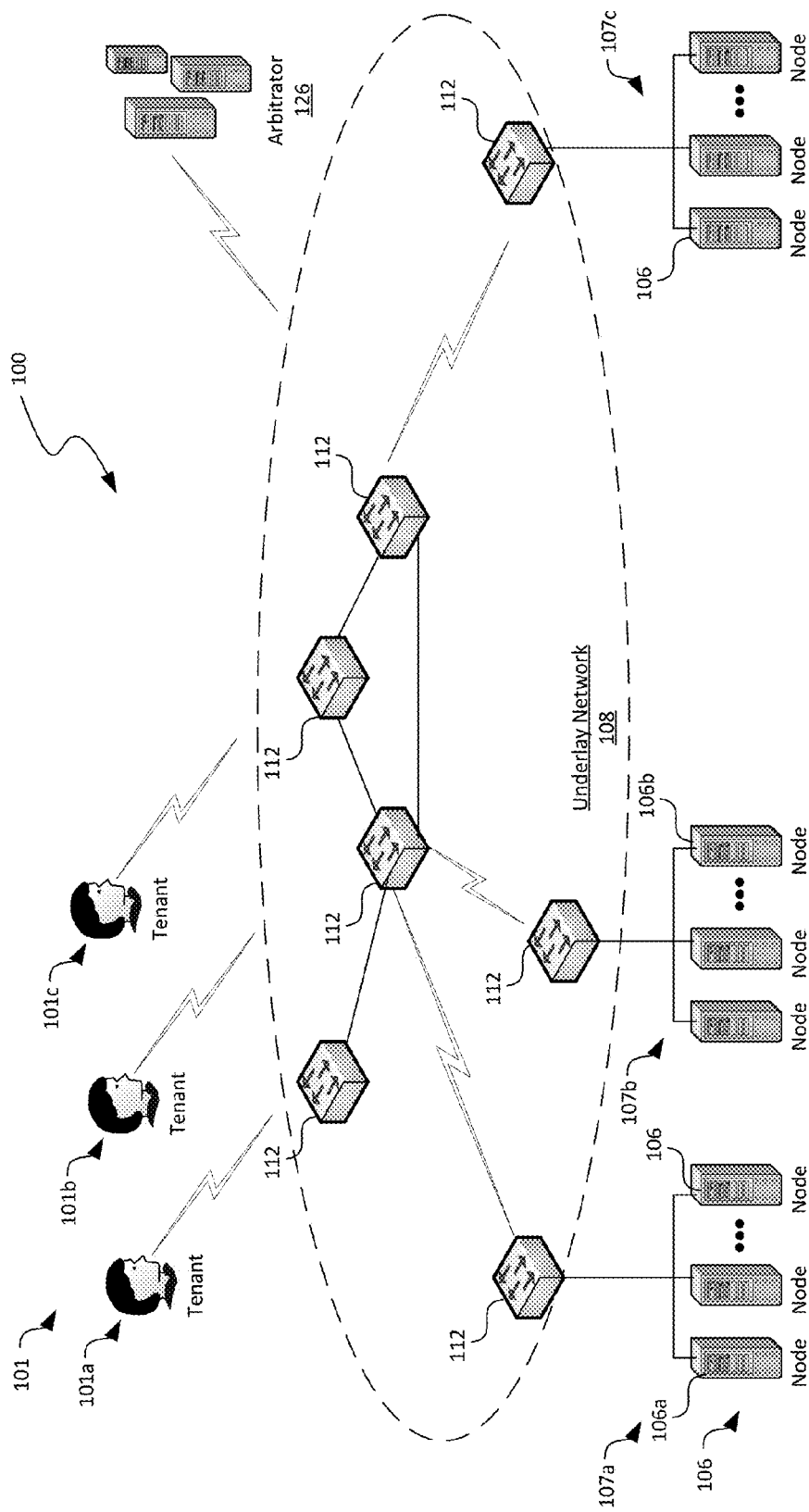
FIG. 1 is a schematic diagram illustrating a distributed computing system implementing arbitration schemes configured in accordance with embodiments of the disclosed technology.

Certain embodiments of systems, devices, components, modules, routines, data structures, and processes for implementing failure monitoring and/or detection schemes in datacenters or other suitable distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-9.

As used herein, the term a "computing system" generally refers to an interconnected computer network having a plurality of network devices that interconnect a plurality of servers or nodes to one another or to external networks (e.g., the Internet). The term "network device" generally refers to a physical network device, examples of which include routers, switches, hubs, bridges, load balancers, security gateways, or firewalls. A "node" generally refers to a physical computing device configured to implement, for instance, one or more virtual machines or other suitable virtualized components. For example, a node can include a server having a hypervisor configured to support one or more virtual machines or other suitable types of virtual components.

A computer network can be conceptually divided into an overlay network implemented over an underlay network. An "overlay network" generally refers to an abstracted network implemented over and operating on top of an underlay network. The underlay network can include multiple physical network devices interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can have one or more tenant end points ("TEPs"), for example, virtual machines. The virtual networks can interconnect multiple TEPs on different nodes. Virtual network devices in the overlay network can be connected to one another by virtual links individually corresponding to one or more network routes along one or more physical network devices in the underlay network.

Also used herein, the term "lease" generally refers to a subject-monitor relationship between a pair of nodes in a distributed computing system. In certain embodiments, the subject-monitor relationship can be established and/or renewed via exchange of periodic renewal requests and renewal responses between a pair of nodes. In one example, a first node, acting as a subject can send periodic renewal requests to a second node acting as a monitor. If the second node determines that the received renewal request is proper, the second node can establish or renew the lease with the first node by transmitting a renewal response to the first node and inferring that the first node is operating normally. In other embodiments, the subject-monitor relationship can be established and/or renewed via query-response, event monitoring, or other suitable techniques.

A lease can be lost or failed when, for example, an appropriate renewal request (e.g., in an appropriate format) from the first node is not received at the second node within a preset lease period. Upon a loss of the lease, the first and/or second nodes can initiate a process referred to herein as "arbitration" to determine whether one of the first or second node can continue to operate and the other is to be terminated, as described in more detail below. A lease can be a one-way lease when the first node monitors the second node but not vice versa. A lease can be a two-way lease when the second node also acts as a monitor for the first node.

An "arbitration" as used herein generally refers to a process of determining whether one of a pair of nodes can continue to operate while the other must terminate itself when a lease between the pair of nodes is lost. The determination can be based on a type of the lease that is lost, arbitration history between the pair of nodes, or other suitable information. For instance, in a two-way lease example, a first node can transmit an arbitration request to an arbitrator (e.g., a management node) for declaring that a second node has failed when a lease between the first and second nodes is lost. In response, the arbitrator can grant the arbitration request from the first node allowing the first node to continue to operate or to "live" (referred to as a "positive arbitration result") while the second node is to be terminated, shutdown, or to "die." Alternately, the arbitrator can reject the arbitration request from the first node (referred to as a "negative arbitration result") and in response, the first node would terminate itself or die.

Unlike in other arbitration schemes, the arbitrator can also issue a "delay arbitration result" that is neither positive nor negative to the first node in response to receiving the arbitration request from the first node. The delay arbitration result allows the first node to continue to operate or to live, without having the second node to terminate itself. Instead, the arbitrator can determine a health condition of the second node by, for example, monitoring for another arbitration request from the second node. If an arbitration request is received from the second node within a preset waiting period, the arbitrator can issue a "neutral arbitration result" to both the first and second nodes, allowing both the first and second nodes to continue to operate. As such, the second node is also allowed to live even though the arbitration request from the first node arrives at the arbitrator first when the lease between the first and second nodes is lost. Thus, by allowing both the first and second nodes to live, reduction of capacity in distributed computing systems can be lowered when compared to arbitration schemes in which one of the first or second node must terminate itself. Further details of several embodiments of the disclosed technology are described below with reference to FIGS. 1-9.

FIG. 1 is a schematic diagram illustrating a distributed computing system 100 implementing arbitration schemes configured in accordance with embodiments of the disclosed technology. As shown in FIG. 1, the distributed computing system 100 can include an underlay network 108 interconnecting a plurality of nodes 106, a plurality of tenants 101, and an arbitrator 126 to one another. Even though particular components of the distributed computing system 100 are shown in FIG. 1, in other embodiments, the distributed computing system 100 can also include network storage devices, maintenance managers, and/or other suitable components (not shown) in addition to or in lieu of the components shown in FIG. 1.

As shown in FIG. 1, the underlay network 108 can include multiple network devices 112 that interconnect the multiple nodes 106, the tenants 101, and the arbitrator 126. In certain embodiments, the nodes 106 can be organized into racks, action zones, groups, sets, or other suitable divisions. For example, in the illustrated embodiment, the nodes 106 are grouped into three node sets identified individually as first, second, and third node sets 107a-107c. In the illustrated embodiment, each of the node sets 107a-107c is operatively coupled to corresponding network devices 112a-112c, respectively, which are commonly referred to as "top-of-rack" or "TOR" network devices. The TOR network devices 112a-112c can then be operatively coupled to additional network devices 112 to form a computer network in a hierarchical, flat, mesh, or other suitable types of topology. The computer network can allow communications among the nodes 106, the arbitrator 126, and the tenants 101. In other embodiments, the multiple node sets 107a-107c can share a single network node 112 or can have other suitable arrangements.

The nodes 106 can individually be configured to provide computing, storage, and/or other suitable cloud computing services to the individual tenants 101. For example, as described in more detail below with reference to FIG. 2, one of the nodes 106 can initiate and maintain one or more virtual machines 144 (shown in FIG. 2) upon requests from the tenants 101. The tenants 101 can then utilize the instantiated virtual machines 144 to perform computation, communication, and/or other suitable tasks. In certain embodiments, one of the nodes 106 can provide virtual machines 144 for multiple tenants 101. For example, the node 106a can node three virtual machines 144 individually corresponding to each of the tenants 101a-101c. In other embodiments, multiple nodes 106 can node virtual machines 144 for the tenants 101a-101c.

In accordance with several embodiments of the disclosed technology, the arbitrator 126 can be configured to determine whether any of a pair of nodes 106 can be allowed to continue to operate or is must terminate itself when a lease between the pair of nodes 106 is lost. In certain embodiments, the arbitrator 126 can include a standalone server, desktop computer, laptop computer, or other suitable types of computing device operatively coupled to the underlay network 108. In other embodiments, the arbitrator 126 can include one of the nodes 106. In further embodiments, the arbitrator 126 can be implemented as one or more network services executing on and provided by, for example, one or more of the nodes 106 or another server (not shown). Even though only one arbitrator 126 is shown in FIG. 1, in yet further embodiments, the distributed computing system 100 can include multiple arbitrators (e.g., as shown in FIGS. 5A-5D). Example components and operations of the arbitrator 126 are described in more detail below with reference to FIGS. 3A-6.

Figure 2:
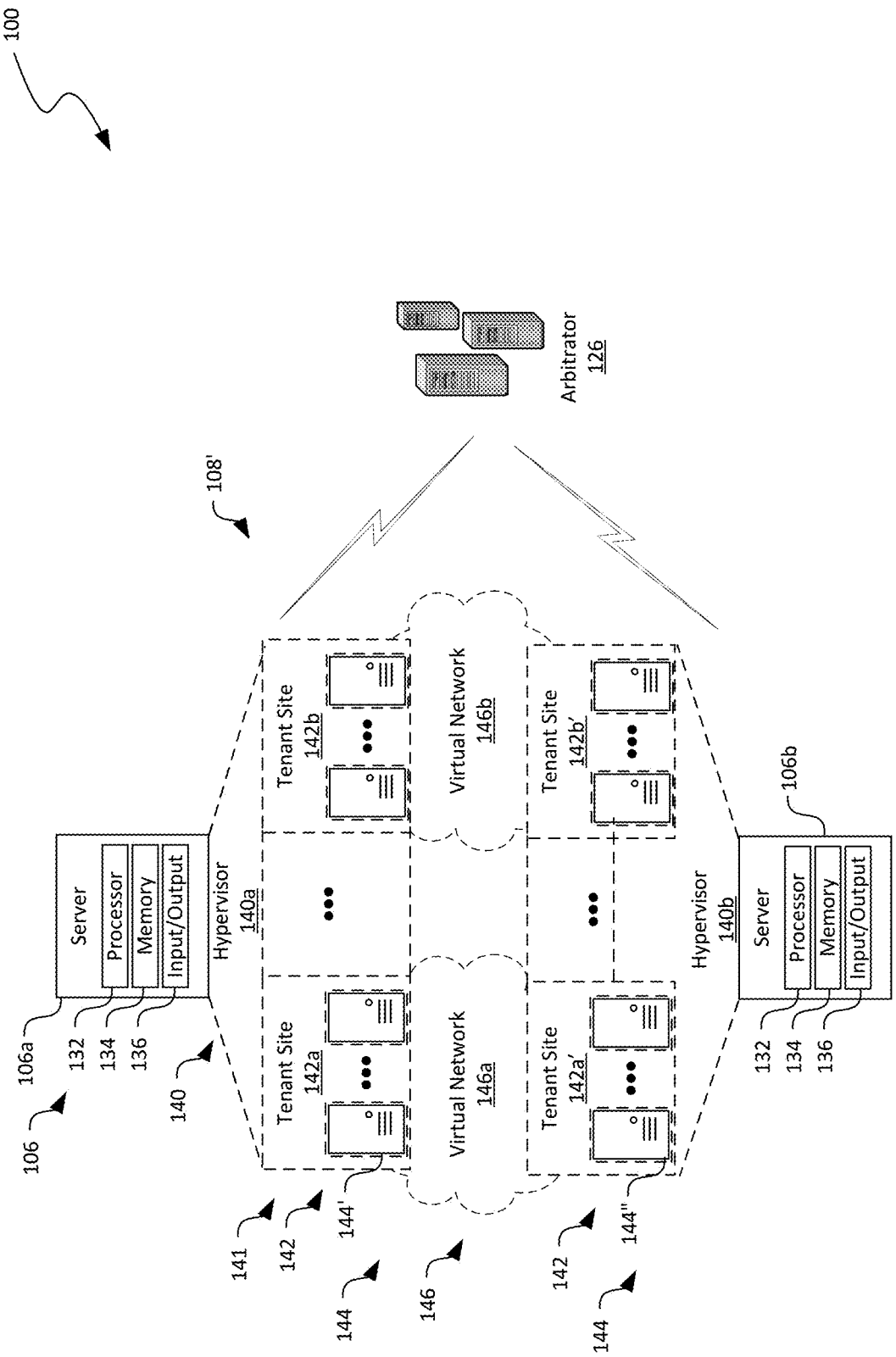
FIG. 2 is a schematic diagram illustrating certain hardware/software components of the distributed computing system of FIG. 1 in accordance with embodiments of the disclosed technology.

FIG. 2 is a schematic diagram illustrating an overlay network 108' implemented on the underlay network 108 of FIG. 1 in accordance with embodiments of the disclosed technology. In FIG. 2, only certain components of the underlay network 108 of FIG. 1 are shown for clarity. As shown in FIG. 2, the first node 106a and the second node 106b can each include a processor 132, a memory 134, and an input/output component 136 operatively coupled to one another. The processor 132 can include a microprocessor, a field-programmable gate array, and/or other suitable logic devices. The memory 134 can include volatile and/or non-volatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIG. 5A). The input/output component 136 can include a display, a touch screen, a keyboard, a mouse, a printer, and/or other suitable types of input/output devices configured to accept input from and provide output to an operator and/or an automated software controller (not shown).

The first and second nodes 106a and 106b can individually contain instructions in the memory 134 executable by the processors 132, cause the individual processors 132 to provide a hypervisor 140 (identified individually as first and second hypervisors 140a and 140b) and a status agent 141 (identified individually as first and second status agent 141a and 141b). Even though the hypervisor 140 and the status agent 141 are shown as separate components, in other embodiments, the status agent 141 can be a part of the hypervisor 140 or an operating system (not shown) executing on the corresponding node 106. In further embodiments, the status agent 141 can be a standalone application.

The hypervisors 140 can be individually configured to generate, monitor, terminate, and/or otherwise manage one or more virtual machines 144 organized into tenant sites 142. For example, as shown in FIG. 2, the first node 106a can provide a first hypervisor 140a that manages first and second tenant sites 142a and 142b, respectively. The second node 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular tenant 101 (FIG. 1). For example, the first node 106a and the second node 106b can both host the tenant site 142a and 142a' for a first tenant 101a (FIG. 1). The first node 106a and the second node 106b can both host the tenant site 142b and 142b' for a second tenant 101b (FIG. 1). Each virtual machine 144 can be executing a corresponding operating system, middleware, and/or applications.

Also shown in FIG. 2, the computing system 100 can include an overlay network 108' having one or more virtual networks 146 that interconnect the tenant sites 142a and 142b across multiple nodes 106. For example, a first virtual network 142a interconnects the first tenant sites 142a and 142a' at the first node 106a and the second node 106b. A second virtual network 146b interconnects the second tenant sites 142b and 142b' at the first node 106a and the second node 106b. Even though a single virtual network 146 is shown as corresponding to one tenant site 142, in other embodiments, multiple virtual networks (not shown) may be configured to correspond to a single tenant site 146.

The virtual machines 144 on the virtual networks 146 can communicate with one another via the underlay network 108 (FIG. 1) even though the virtual machines 144 are located or hosted on different nodes 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses.

In certain embodiments, the first and second nodes 106a and 106b can be in a one-way lease. Operations of the first and second nodes 106a and 106b in the one-way lease and the arbitrator 126 are described in more detail below with reference to FIGS. 3A-3F. In other embodiments, the first and second nodes 106a and 106b can also be in a two-way lease. Operations of the first and second nodes 106a and 106b in the two-way lease and the arbitrator 126 are described in more detail below with reference to FIGS. 4A-4F. In further embodiments, the first and second nodes 106a and 106b can also have an implicit lease, as described in more detail below with reference to FIG. 6.

FIGS. 3A-3F are block diagrams illustrating components of first and second nodes 106a and 106b in a one-way lease and an arbitrator 126 during stages of an arbitration process in accordance with embodiments of the disclosed technology. In FIGS. 3A-3F and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may also include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component, and a third component. The foregoing components can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a tablet computer, a network server, a laptop computer, a smartphone, and/or other suitable computing devices.

Equally, components may include hardware circuitry. In certain examples, hardware may be considered fossilized software, and software may be considered liquefied hardware. As just one example, software instructions in a component may be burned to a Programmable Logic Array circuit, or may be designed as a hardware component with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media. As used herein, the term "computer readable storage media" excludes propagated signals.

Figure 3A:
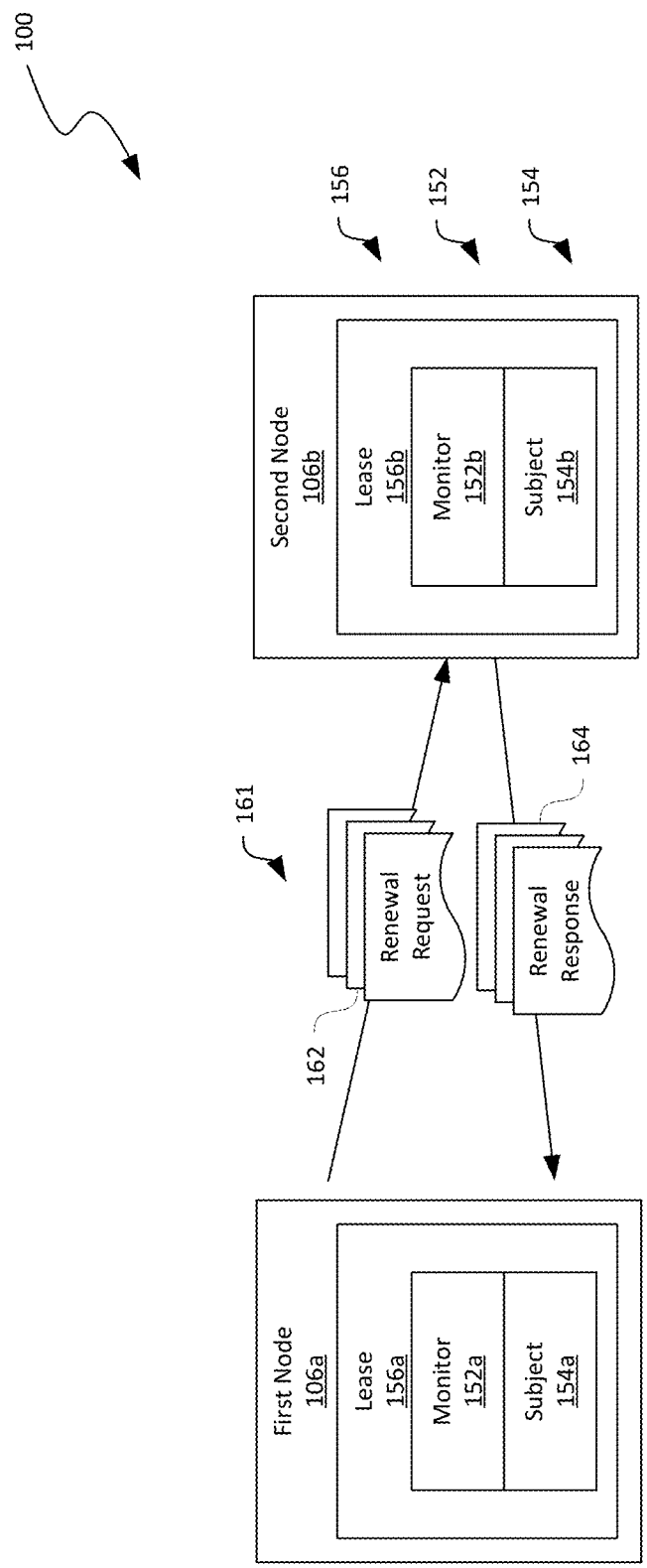
FIGS. 3A-3F are block diagrams illustrating components of two nodes in a one-way lease and an arbitrator during stages of an arbitration process in accordance with embodiments of the disclosed technology.

FIG. 3A illustrates an example one-way lease 161 in which a first node 106a is a subject node, and a second node 106b is a monitor node. As shown in FIG. 3A, the first and second nodes 106a and 106b can each include a lease component 156 having a monitor module 152 and a subject module 154. In FIGS. 3A-3F, the monitor module 152a of the first node 106a and the subject module 152b of the second node 106b are not used for the one-way lease 161 but can be used for two-way leases such as in the example shown in FIGS. 4A-4F.

The monitor module 152 can be configured to monitor whether a lease is lost with a subject node, e.g., the first node 106b in FIG. 3A. In certain embodiments, the subject module 154a of the first node 106a can be configured to periodically transmit a renewal request 162 to the second node 106b via, for example, the overlay network 108' of FIG. 2 and the underlay network 108 of FIG. 1. The monitor module 152b of the second node 106b can be configured to analyze the received renewal request 162 to determine whether the renewal request 162 is proper or appropriate based on one or more of a time of arrival, a format of the renewal request 162, content of the renewal request 162, a port at which the renewal request 162 is received at the second node 106b, or other suitable characteristics of the renewal request 162.

In response to determining that the renewal request 162 is proper, the monitor module 152b at the second node 106b can be configured to generate and transmit a renewal response 164 to the first node 106a, thereby renewing the lease with the first node 106a. Upon receiving the renewal response 164, the lease component 156a of the first node 106a can reset a timer for a lease period, expiration of which would trigger the subject module 154a to transmit another renewal request 162. If no renewal response 164 is received within a threshold period, the lease component 156a of the first node 106a can initiate an arbitration process by transmitting a first arbitration request 166a (FIG. 3B) to the arbitrator 126 (FIG. 3B), as described in more detail below with reference to FIG. 3B.

In response to determining that the renewal request 162 from the first node 106a is not proper, for example, the renewal request 162 is not received before a lease period (e.g., 120 seconds) has expired, the monitor component 152b of the second node 106b can be configured to indicate that the one-way lease 161 with the first node 106a is lost. In response, the lease component 156b of the second node 106b can initiate an arbitration process by transmitting a second arbitration request 166b (FIG. 3B) to the arbitrator 126, as described in more detail below with reference to FIG. 3B.

Figure 3B:
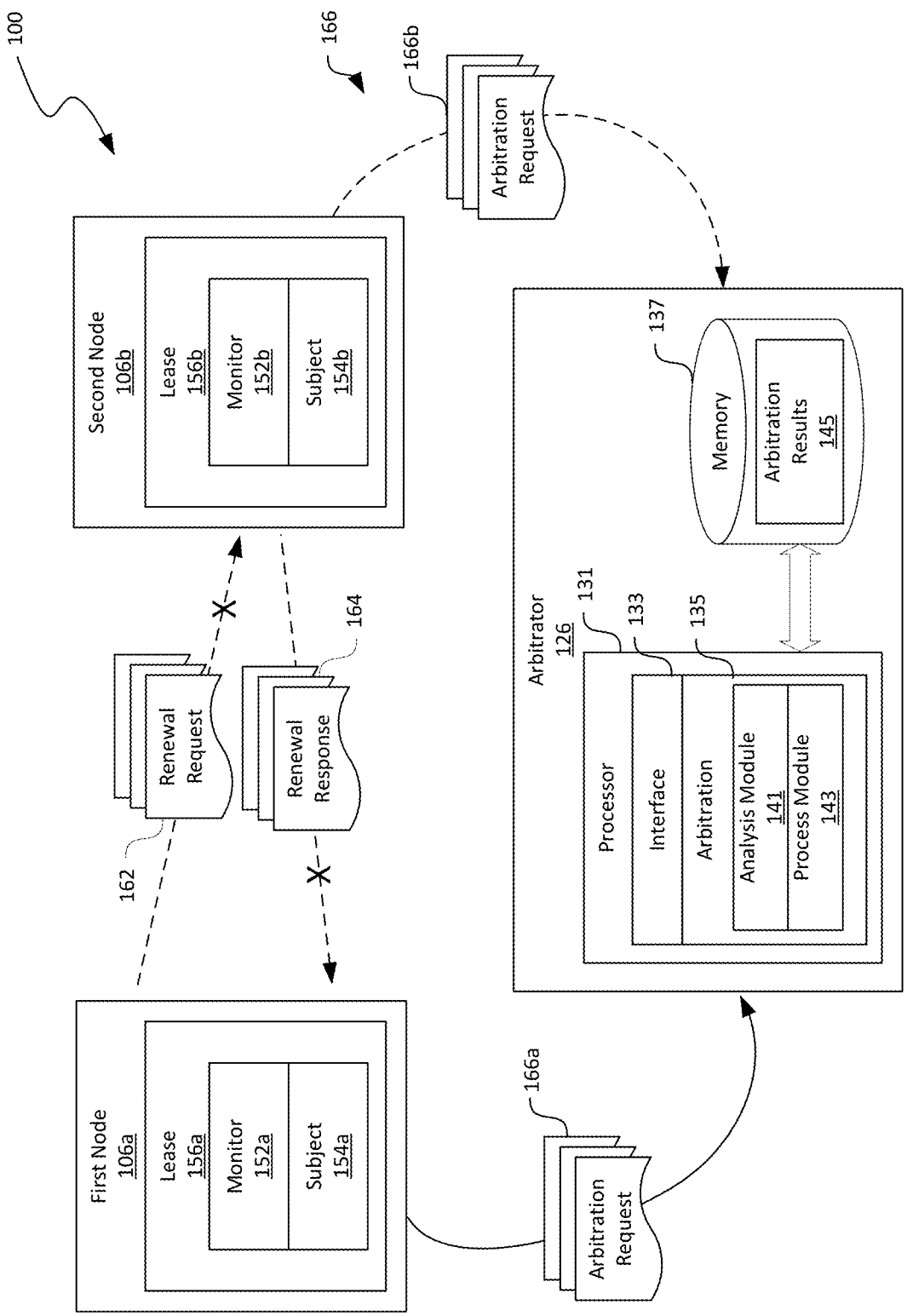

As shown in FIG. 3B, the arbitrator 126 can include a processor 131 and a memory 137 that are generally similar in structure and function as the processor 132 and memory 134 in FIG. 2. The memory 137 can contain records of arbitration results 145 from previous arbitration processes. The memory 137 can also contain instructions that the processor 131 can execute to provide several components for processing the arbitration requests 166a and 166b. For example, the processor 131 can provide an interface component 133 and an arbitration component 135 operatively coupled to one another. In other embodiments, the processor 131 can also provide a calculation component, a display component, or other suitable components.

The interface component 133 can be configured to transmit and receive messages to/from the first and second nodes 106a and 106b. In certain embodiments, the interface component 133 can include a network interface driver, a virtual router, or other suitable modules. The interface component 133 can also be configured to forward messages, for example, the first and second arbitration requests 166a and 166b from the first and second nodes 106a and 106b to the arbitration component 135 for further processing.

As shown in FIG. 3B, the arbitration component 135 can include an analysis module 141 and a process module 143. The analysis module 141 can be configured to analyze the received arbitration requests 166 and determine whether the first and/or second nodes 106a and 106b can continue to operate or are to be terminated. The process component 143 can be configured to issue various types of arbitration results (shown in FIG. 3C) based on analysis results from the analysis module 141. Details of analyzing the arbitration requests 166 are described below using an example in which the first node 106a is the subject node and the second node 106b is the monitor node in the one-way lease 161 (FIG. 3A).

In certain embodiments, the analysis module 141 can be configured to determine whether a received arbitration request 166 is from a monitor node or from a subject node. For example, as shown in FIG. 3B, the analysis module 141 can be configured to determine that the first arbitration request 166a is from a subject node and the second arbitration request 166b is from a monitor node based on indication included in the arbitration requests 166, prior lease assignments, previous arbitration results 145 in the memory 137, or other suitable information. In other embodiments, such analysis can be omitted.

Figure 3C:
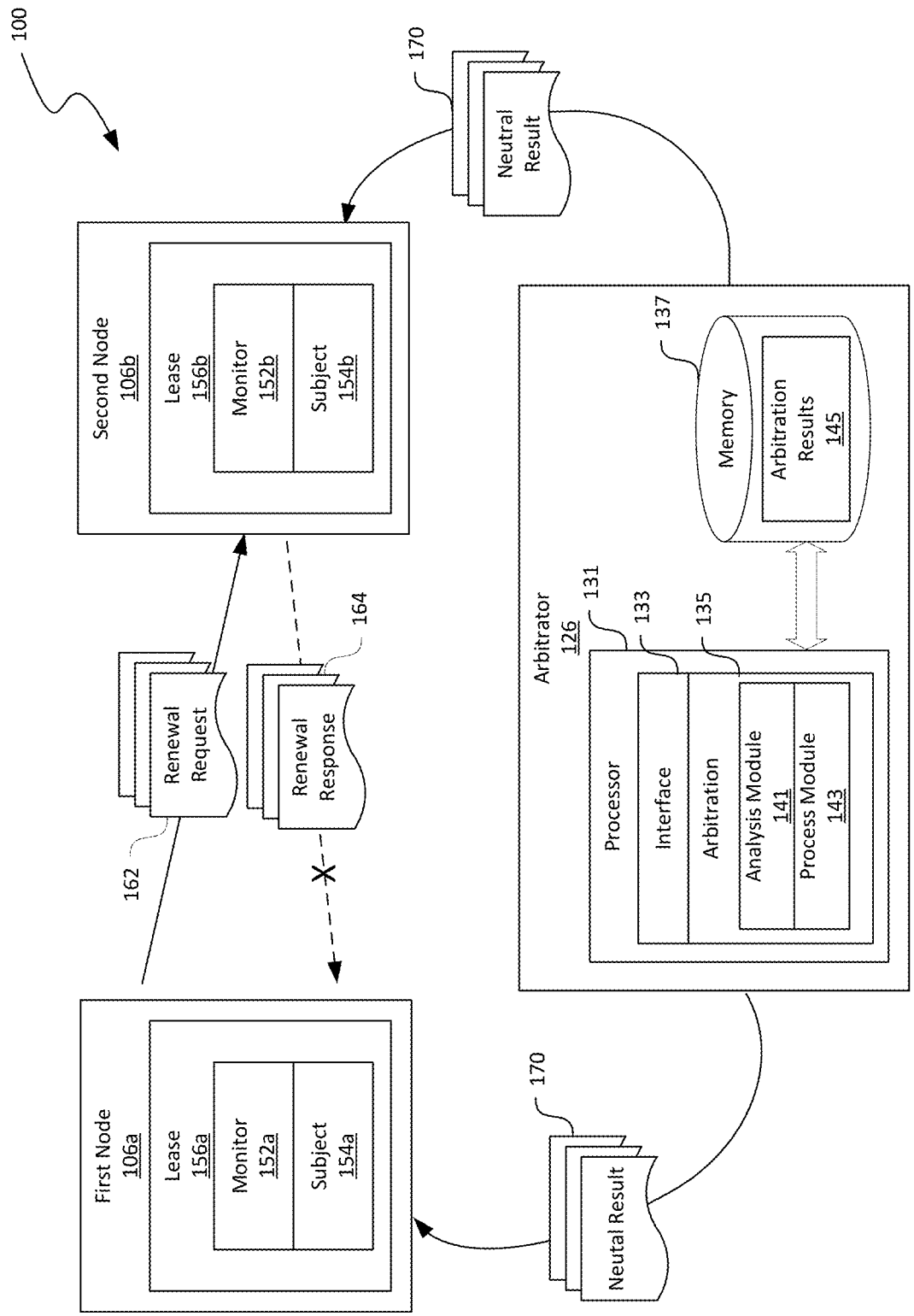

When the first arbitration request 166a arrives first at the arbitrator 126, the analysis module 141 can be configured to indicate to the process module 143 that the subject node, i.e., the first node 106a is operating normally. The process module 143 can then issue a neutral arbitration result 170 to the first node 106a, as shown in FIG. 3C. However, the neutral arbitration result 170 to the first node 106b does not cause the second node 106b to terminate. Instead, the process module 143 can issue another neutral arbitration result 170 to the second node 106b in response to the second arbitration request 166b (FIG. 3B) as well to allow the second node 106b to continue to operate. As such, both the first node 106a and the second node 106b are allow to continue to operate or to live, without reducing capacity in the distributed computing system 100.

Figure 3D:
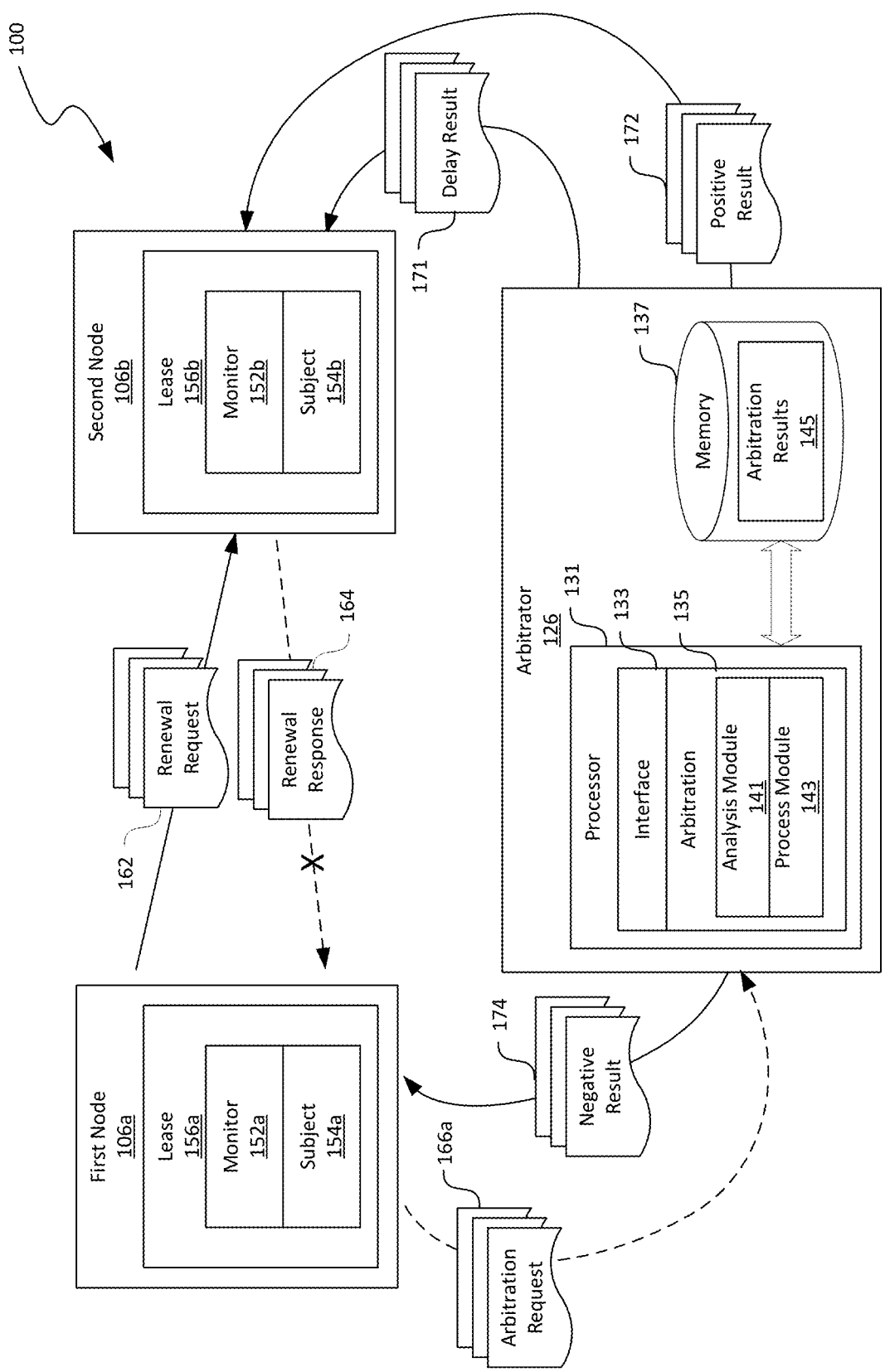

When the second arbitration request 166b arrives first at the arbitrator 126, the process module 143 can initially issue a delay arbitration result 171 to the second node 106b, as shown in FIG. 3D. The analysis module 141 can be configured to then determine whether the subject node, i.e., the first node 106a is to be terminated. In one embodiment, the analysis module 141 can declare that the first node 106a is to be terminated if the first arbitration request 166a (shown in phantom lines for clarity) from the first node 106a is not received within a threshold period after receiving the second arbitration request 166b. In other embodiments, the analysis module 141 can also determine whether the first node 106a is to be terminated by querying the first node 106a, querying an event log associated with the first node 106a, or utilizing other suitable techniques.

In response to determining that the first node 106a is to be terminated, the analysis module 141 can indicate to the process module 143 accordingly. As shown in FIG. 3D, the process module 143 can then be configured to grant the second arbitration request 166b from the second node 106b by issuing a positive arbitration result 172 to the second node 106b, allowing the second node 106b to continue to operate. The process module 143 can also be configured to issue a negative arbitration result 174, or not issuing any arbitration result at all, to the first node 106a, and causing the first node 106a to terminate itself.

Figure 3E:
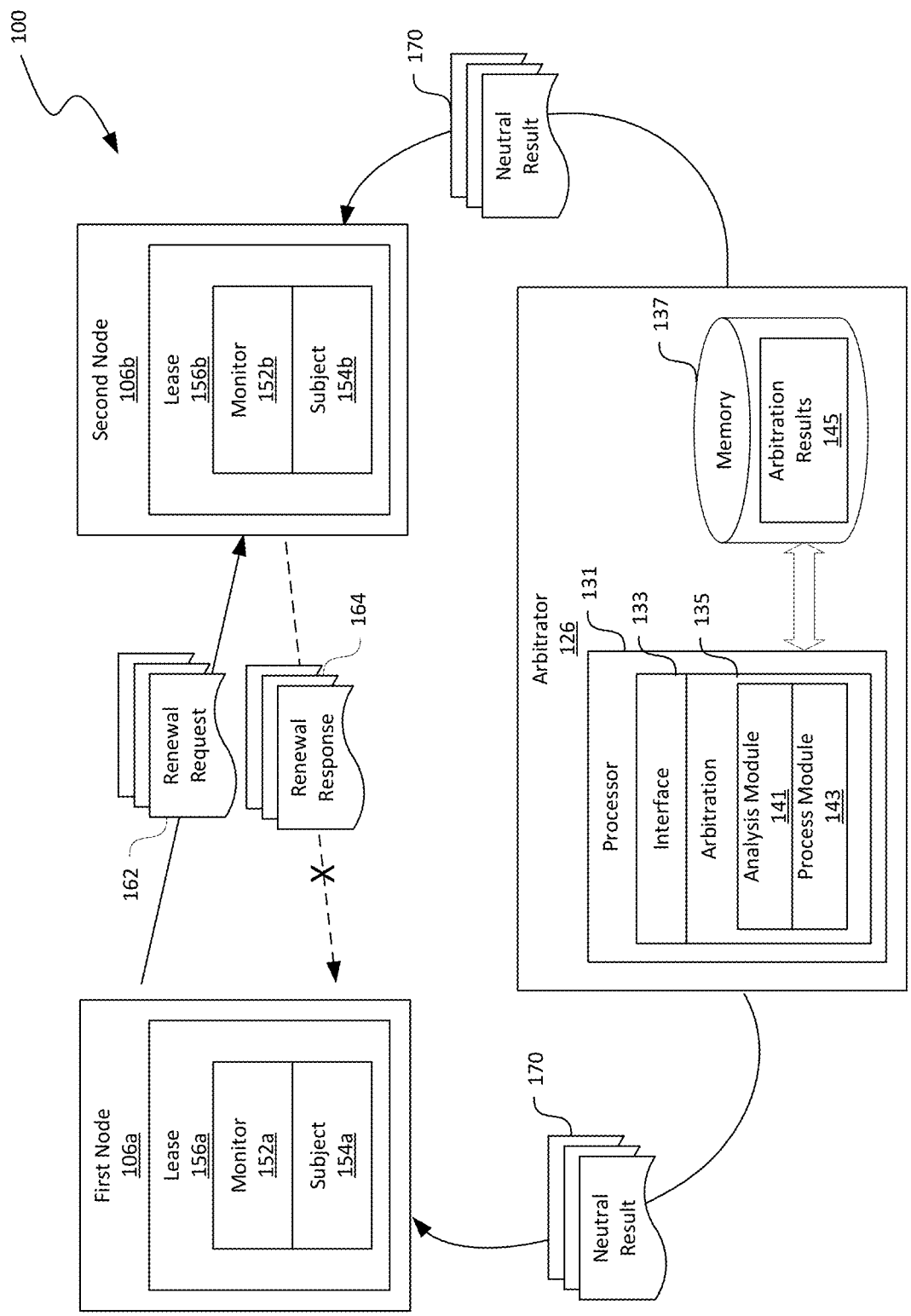

On the other hand, in response to determining that the first node 106a is operating normally, for example, by receiving the first arbitration request 166a within the threshold period, the analysis module 141 can indicate accordingly to the process module 143. As shown in FIG. 3E, the process module 143 can be configured to issue a neutral arbitration result 170 to both the first and second nodes 106a and 106b, and thus allowing both the first and second nodes 106a and 106b to continue to operate. In further embodiments, the arbitration process illustrated in FIGS. 3D-3E can be omitted. Instead, the monitor node, i.e., the second node 106b can simply ignore the loss of the one-way lease with the subject node, i.e., the first node 106a and continue to operate normally.

Figure 3F:
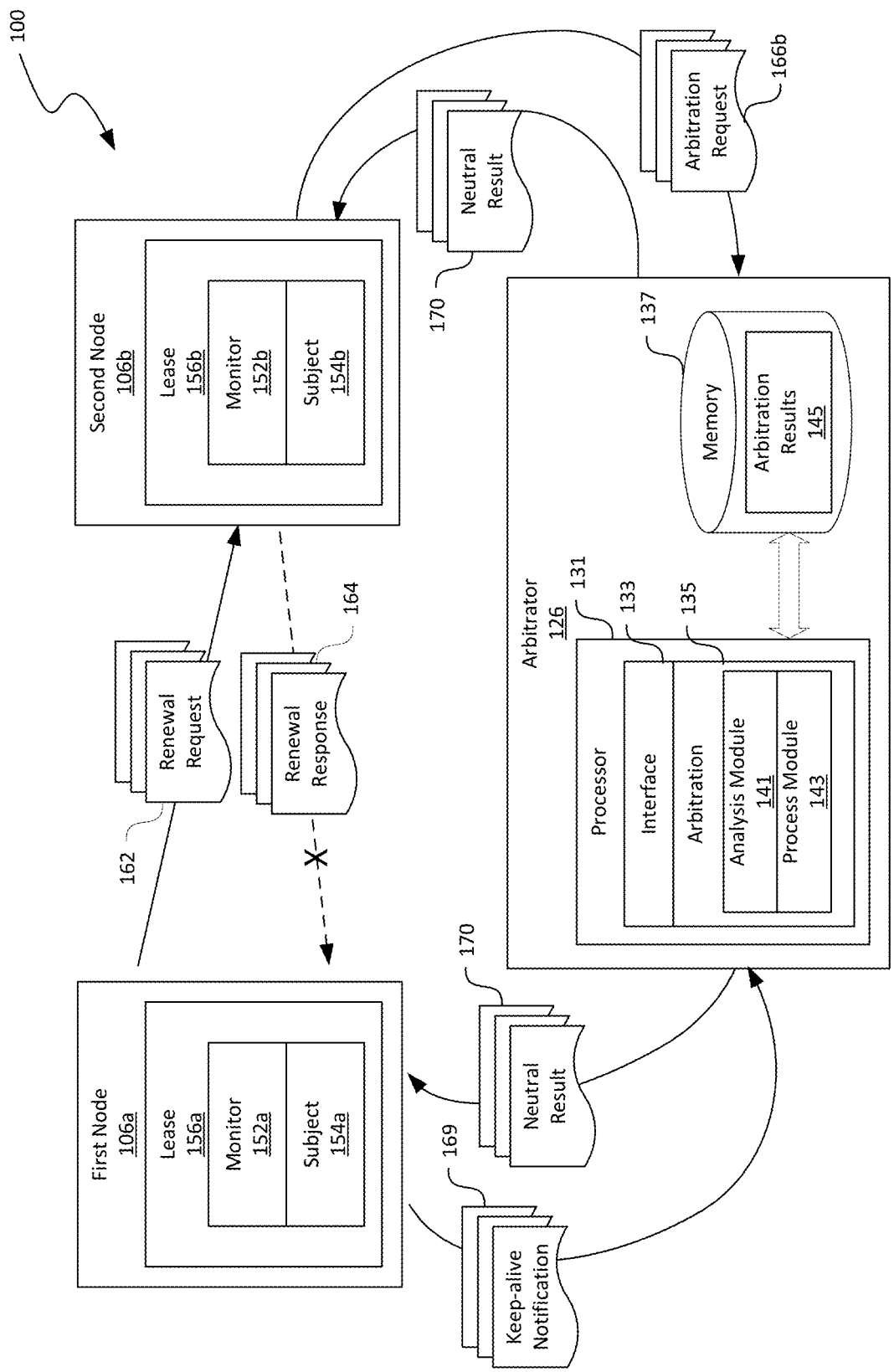

As described above, by utilizing the neutral and delay arbitration results 170 and 171, the first and second nodes 106 can be allowed to continue to operate when experiencing temporary network issues, as shown in FIGS. 3D and 3E, when the first and second nodes 106a and 106b are operating normally. In other embodiments, several embodiments of the disclosed technology can also utilize "keep-alive" notifications in order to avoid terminating nodes 106 due to temporary network issues and reduce failure detection time when a node 106 is actually down. For example, as shown in FIG. 3F, the first node 106a can transmit a keep-alive notification 169 to the arbitrator 126 when the first node 106a determines that the one-way lease 161 (FIG. 3A) with the second node 106b is about to be lost. The keep-alive notification 169 informs the arbitrator 126 that the first node 106 is still operating normally or "alive." The first node 106a can determine that the one-way lease 161 is about to be lost by monitoring an elapsed time after transmitting the renewal request 162 to the second node 106b. If the elapsed time is longer than a threshold (e.g., 5, 10, or 20 milliseconds) and no renewal response 164 has been received, the first node 106a can determine that the one-way lease 161 would probably be lost soon.

As shown in FIG. 3F, when the one-way lease 161 is lost, the second node 106b can send the second arbitration request 166b to the arbitrator 126. In response, the arbitrator 126 can predict a chance of the other node (e.g., the first node 106a) is alive and issue a delay or positive arbitration result 171 or 172 based on previously history related to the first and second nodes 106a and 106b. If the keep-alive notification 169 is in the history, then the arbitrator 126 can have a much higher chance to issue the delay arbitration result 171 to the second node 106b instead of a positive arbitration result 172. In certain embodiments, to avoid sending unnecessary keep-alive notifications 169, the first node 106a can limit a number of such keep-alive notifications 169 by implementing a minimum interval (e.g., 60 seconds) between successive keep-alive notifications 169 or via other suitable techniques. Even though the keep-alive notification 169 is described in the context of the one-way lease 161, in other embodiments, the keep-alive notification 169 can also be used in two-way leases, such as that described below with reference to FIGS. 4A-4F, instead of or in addition to utilizing delay arbitration results 171.

Figure 4A:
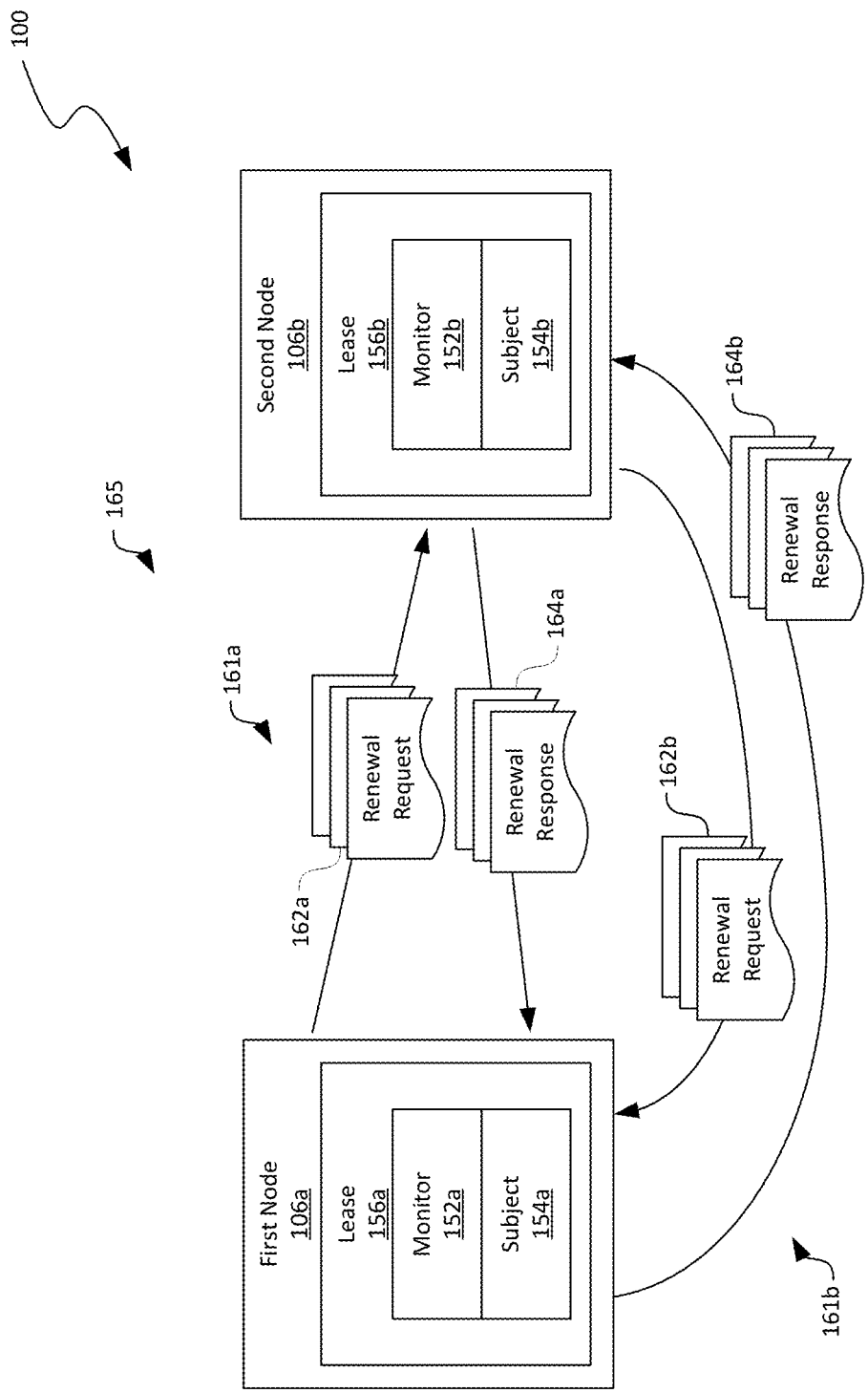
FIGS. 4A-4F are block diagrams illustrating components of two nodes in a two-way lease and an arbitrator during stages of an arbitration process in accordance with embodiments of the disclosed technology.

FIGS. 4A-4F are block diagrams illustrating components of first and second nodes 106a and 106b in a two-way lease 165 and an arbitrator 126 during stages of an arbitration process in accordance with embodiments of the disclosed technology. In FIGS. 4A-4F and other figures herein, components similar in structure and function are identified by similar numbers. For example, as shown in FIG. 4A, the first and second nodes 106a and 106b can each include a lease component 156 having a monitor module 152 and a subject module 154 that are generally similar to corresponding components shown in FIGS. 3A-3F.

FIG. 4A illustrates a two-way lease 165 between the first node 106a and the second node 106b. As such, in a first one-way lease 161a, the first node 106a is a subject node and the second node 106b is a monitor node. In a second one-way lease 161b, the second node 106b is a subject node, and the first node 106a is a monitor node. Thus, the first node 106a can monitor an operating status of the second node 106b by monitoring the renewal requests 162b from the subject module 152b of the second node 106b. In response, the monitor module 154a of the first node 106a can transmit a first renewal response 164a to the second node 106b. The second node 106b can also monitor an operating status of the first node 106a by monitoring the renewal requests 162a from the subject module 154a of the first node 106a. In response, the monitor module 152b of the second node 106b can transmit a second renewal response 164b to the first node 106a.

Figure 4B:
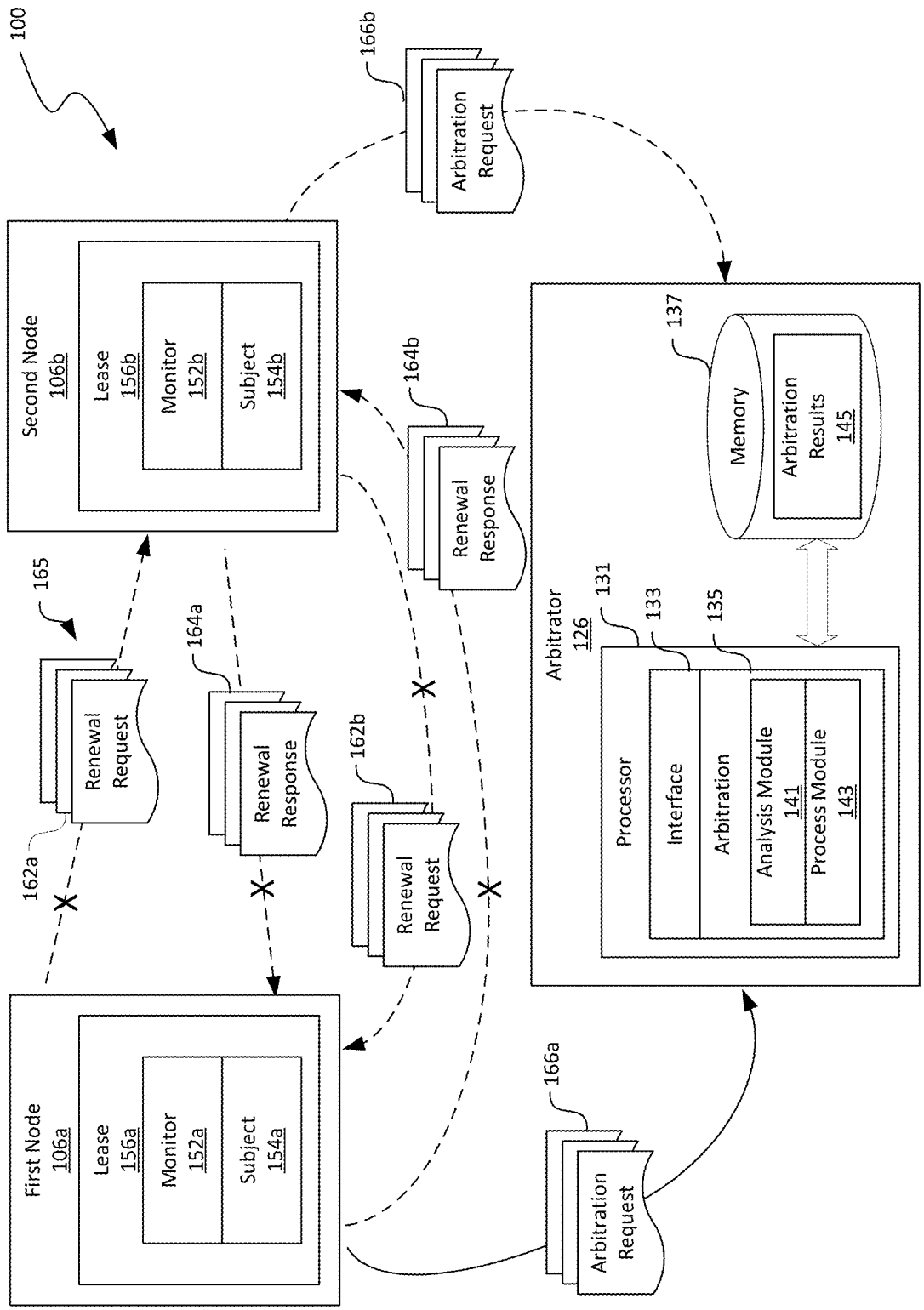

As shown in FIG. 4B, communications failure or other conditions in the distributed computing system 100 can cause the two-way lease 165 to fail. As such, the first and second nodes 106a and 106b can stop receiving the first and second renewal requests 162a and 162b (FIG. 4A) as well as the first and second renewal responses 164a and 164b. In response to a loss of the two-way lease 165, the first and second nodes 106a and 106b can individually initiate an arbitration process with the arbitrator 126 to declare that the other node has failed and is to be terminated. As described in more detail below, several embodiments of the disclosed technology can allow both the first and second nodes 106a and 106b to continue to operate by utilizing neutral and delay arbitration results 170 and 171, respectively.

Figure 4C:
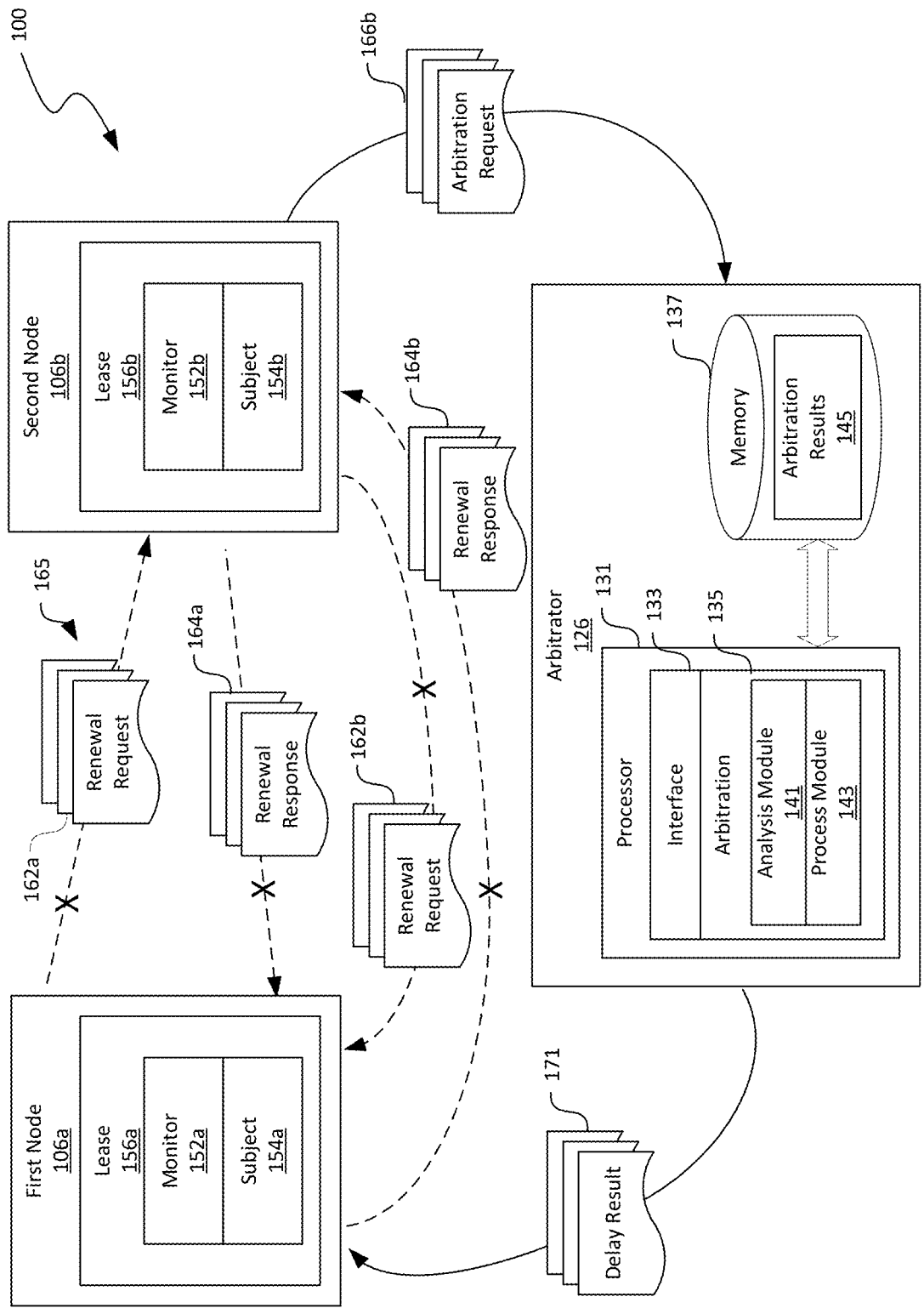

FIG. 4B illustrates a scenario in which a first arbitration request 166a from the first node 106a arrives at the arbitrator 126 before the second arbitration request 166b arrives at the arbitrator 126. Unlike in other arbitration schemes in which a node whose arbitration request arrives first is allowed to continue to operate while the other node is to be terminated, several embodiments of the disclosed technology can allow both the first and second nodes 106a and 106b to continue to operate. For example, as shown in FIG. 4C, instead of granting the first arbitration request 166a from the first node 106a, the process module 143 can be configured to issue a delay arbitration result 171 to the first node 106a. The delay arbitration result 171 can allow the first node 106a to continue to operate while the process module 143 continues to monitor for a second arbitration request 166b from the second node 106b.

Figure 4D:
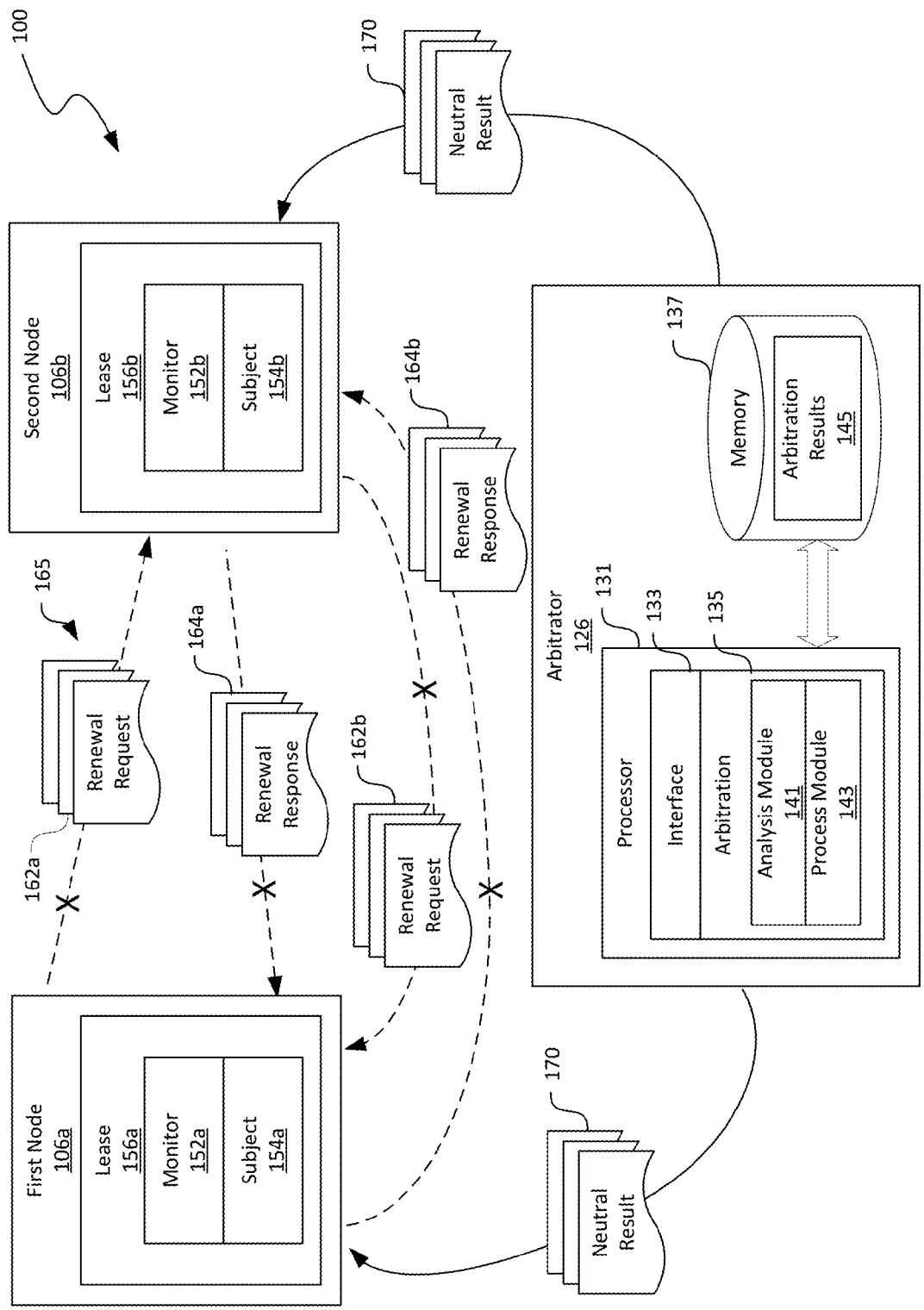
Figure 4E:
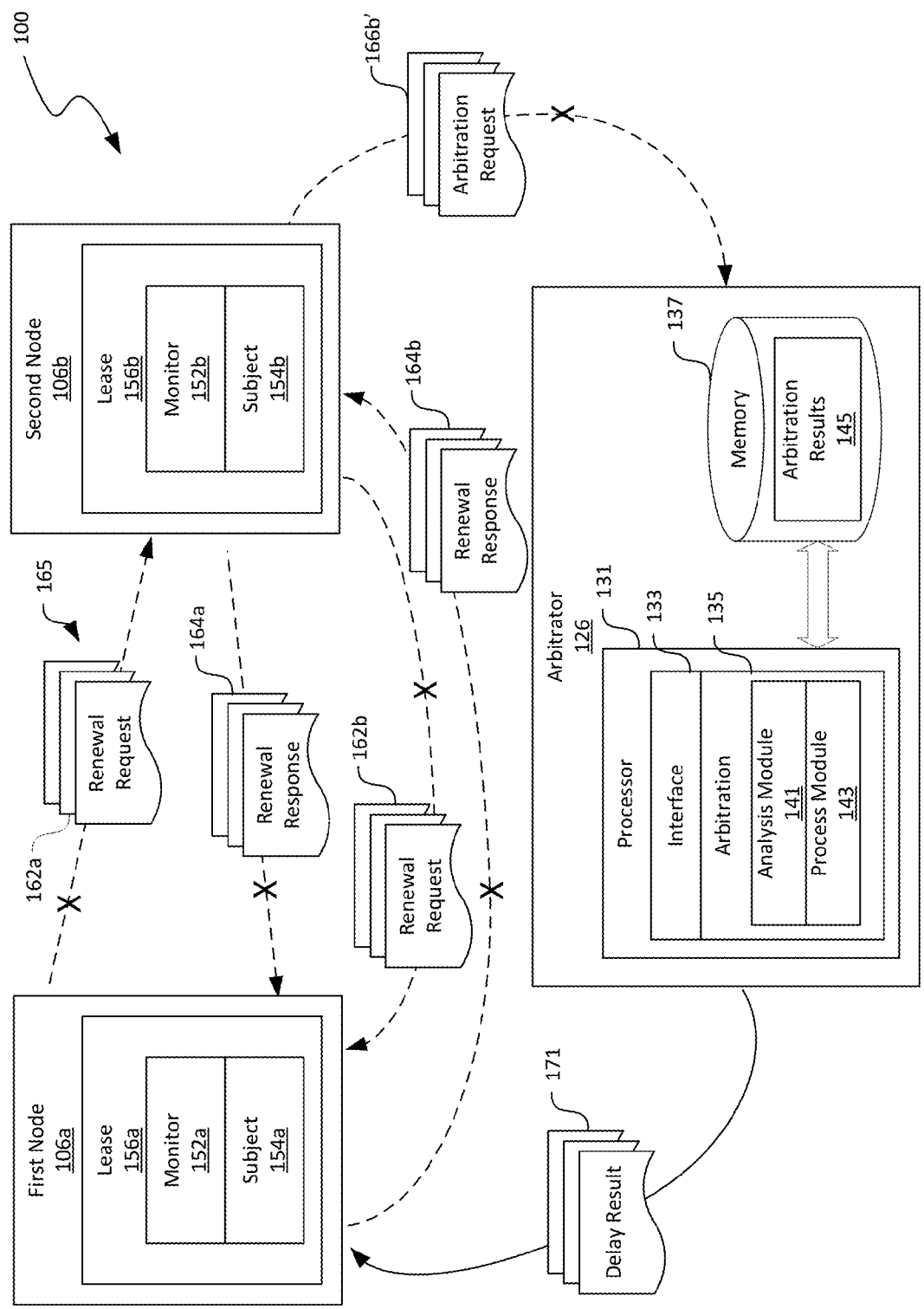
Figure 4F:
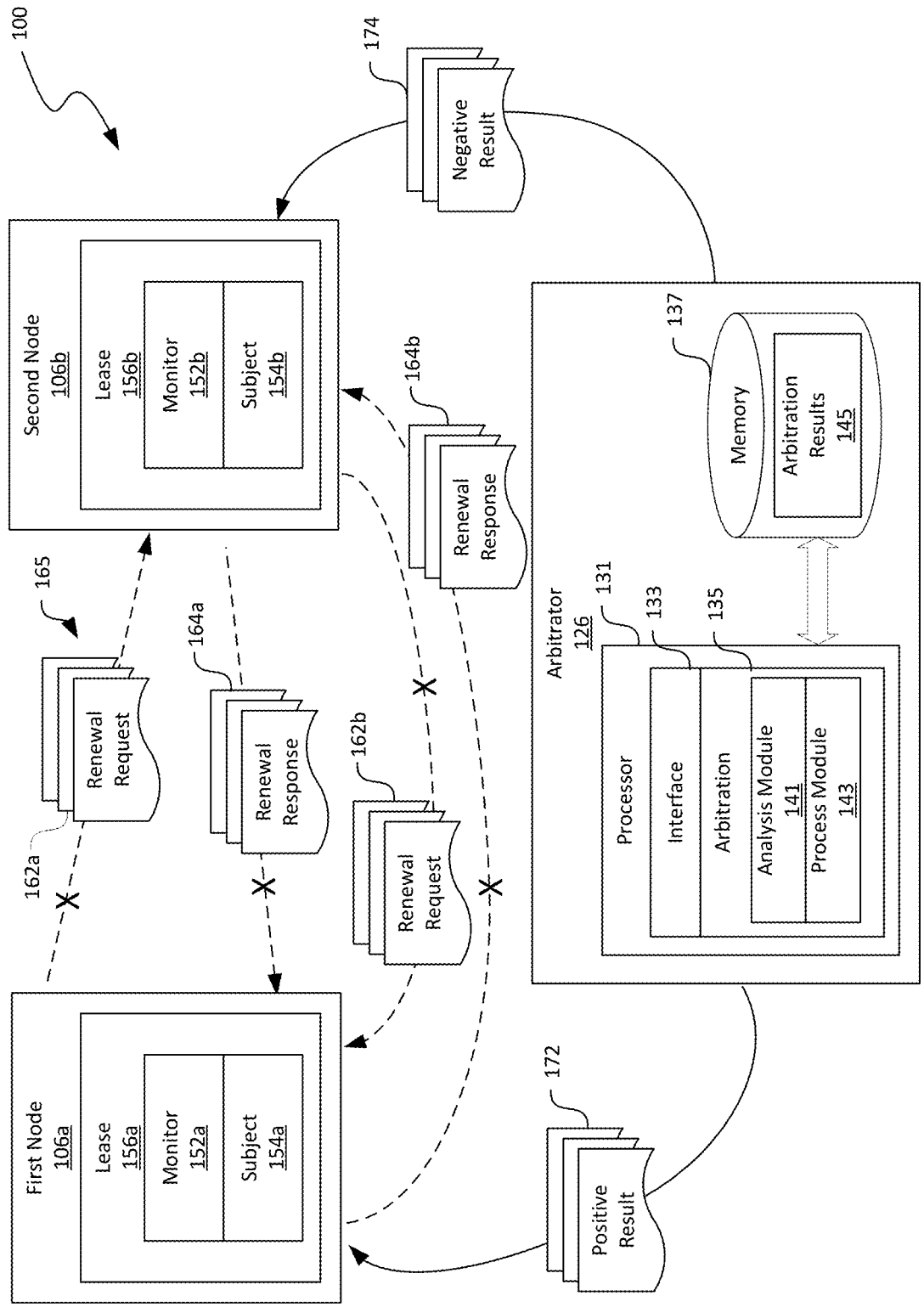

As shown in FIG. 4D, if the second arbitration request 166b arrives at the arbitrator 126 within a waiting period (e.g., 5 milliseconds), the process module 143 can be configured to issue a neutral arbitration result 170 to both the first and second nodes 106a and 106b, and allowing both the first and second nodes 106a and 106b to continue to operate. On the other hand, FIG. 4E illustrates a situation where the second arbitration request 166b does not arrive at the arbitrator 126 during the waiting period. In response, as shown in FIG. 4F, the process module 143 can be configured to issue a positive arbitration result 172 to the first node 106a and issue a negative arbitration result 174 (or no arbitration result at all) to the second node 106b.

As discussed above, several embodiments of the disclosed technology can reduce unnecessary termination of nodes 106 by allowing time for the first or second arbitration request 166a and 166b to reach the arbitrator 126. Typically, in distributed computing systems, even when sent simultaneously, the first and second arbitration requests 166a and 166b can still arrive at the arbitrator 126 at different times due to network traffic conditions, network routes, or other reasons. Thus, as discussed in the example above, the first arbitration request 166a can arrive before the second arbitration request 166b at the arbitrator 126. Instead of terminating at least one of the first or second node 106a and 106b in the arbitration process, both the first and second nodes 106a and 106b can be allowed to live if the first and second arbitration requests 166a and 166b arrive at the arbitrator 126 within the waiting period, and thus preventing reduction of capacity in distributed computing system 100.

Figure 5A:
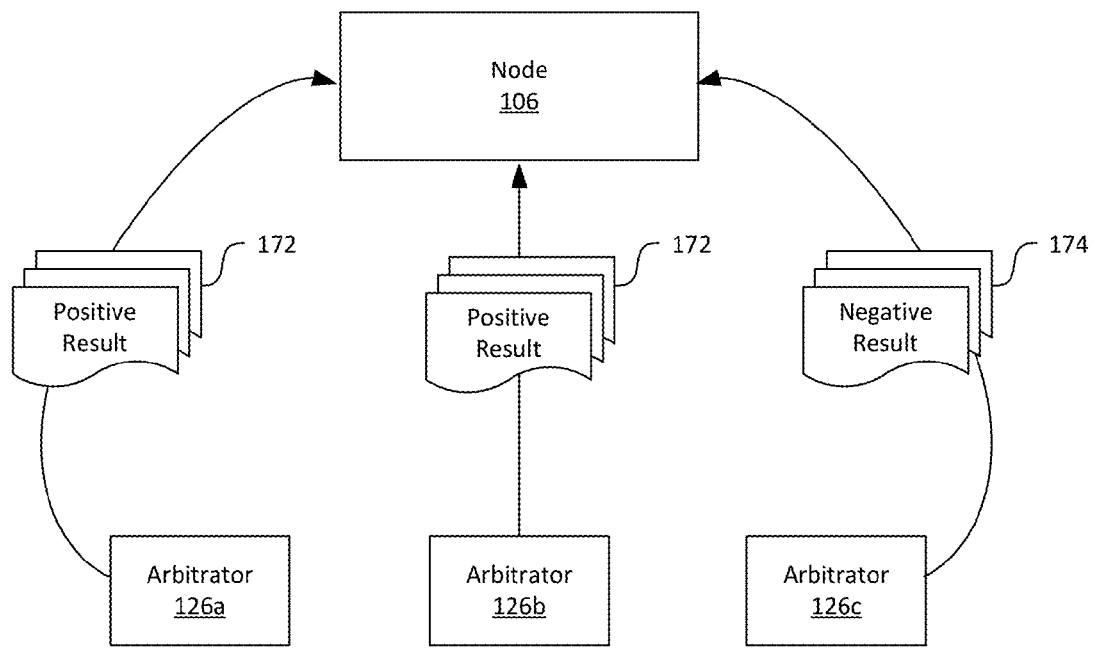
FIGS. 5A-5D are block diagrams illustrating arbitration based on multiple arbitrators in accordance with embodiments of the disclosed technology.
Figure 5B:
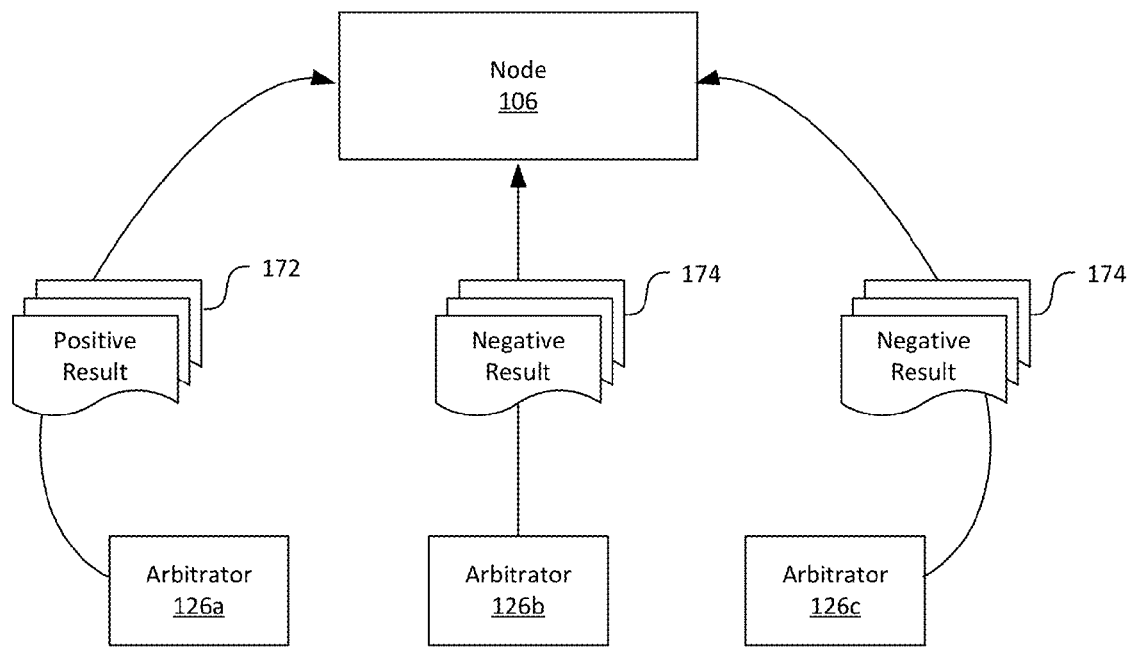
Figure 5C:
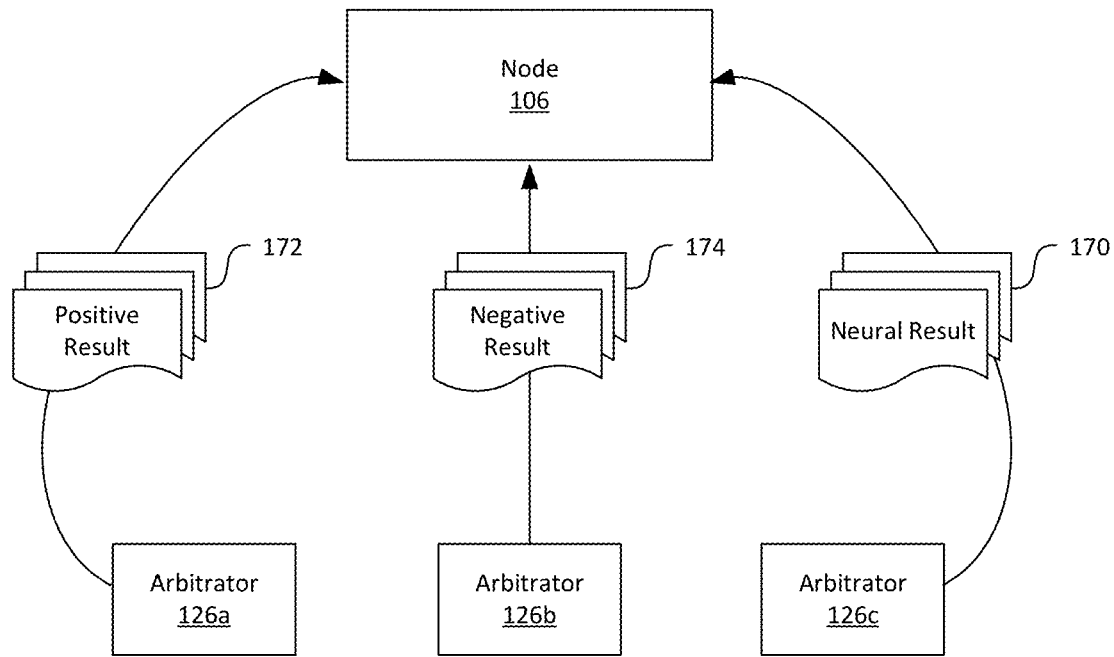

Even though only one arbitrator 126 is shown in FIGS. 3B-4F, in other embodiments, the distributed computing system 100 can also utilize multiple arbitrators. FIGS. 5A-5D illustrate arbitration based on multiple arbitrators in accordance with embodiments of the disclosed technology. In FIGS. 5A-5C, three arbitrators 126a-126c are shown for illustration purposes. In other embodiments, the distributed computing system 100 can utilize five, seven, nine, or any other suitable number of arbitrators.

Figure 5D:
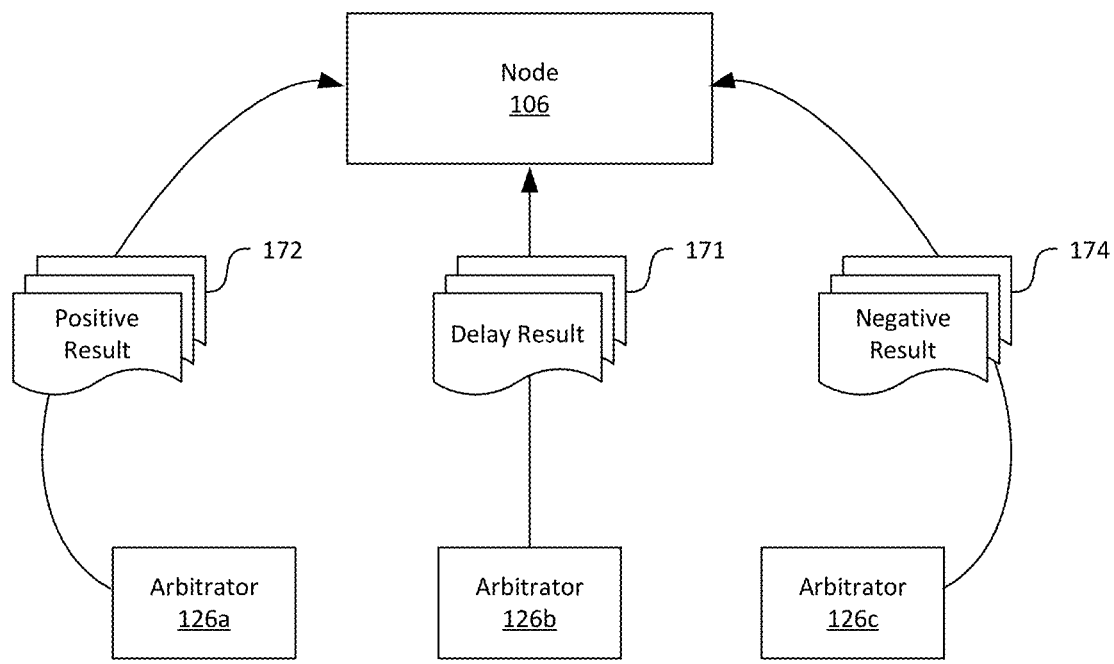

In certain embodiments, arbitration using multiple arbitrators 126 can be based on a simple majority of decisions, often referred to as a quorum. For example, as shown in FIG. 5A, if there is a quorum of the positive results 172, then the node 106 can deem the final arbitration result as positive. In another example, as shown in FIG. 5B, if there is a quorum of the negative results 174, then the node 106 can deem the final arbitration result as negative. In yet another example, as shown in FIG. 5C, if the positive result 172 and the neutral result 170 form a quorum over the negative result 174, the node 106 can deem the final arbitration result as a neutral arbitration result. In a further example, as shown in FIG. 5D, if the positive result 172 and the delay result 170 form a quorum, the node 106 can deem the overall arbitration result as a delay result 171. In certain embodiments, the node 106 can also check with the arbitrator 126b after a period of time to determine whether the delay result 171 is modified to a positive result 172 or a negative result 170, and reevaluate for the final arbitration result based thereon. In other embodiments, such modification can be transmitted to the node 106 by the arbitrator 126b.

As discussed above, after a lease is lost, for example, between the first and second nodes 106a and 106b in FIGS.

4A-4F, the first and second nodes 106a and 106b can continue to live. Before a new lease is established, failure detection may not be available between the first and second nodes 106a and 106b if the first and second nodes 106a and 106b do not have lease relationships with other nodes 106. Thus, if one of the first or second node 106a and 106b fails, such a failure may not be detected.

Figure 6:
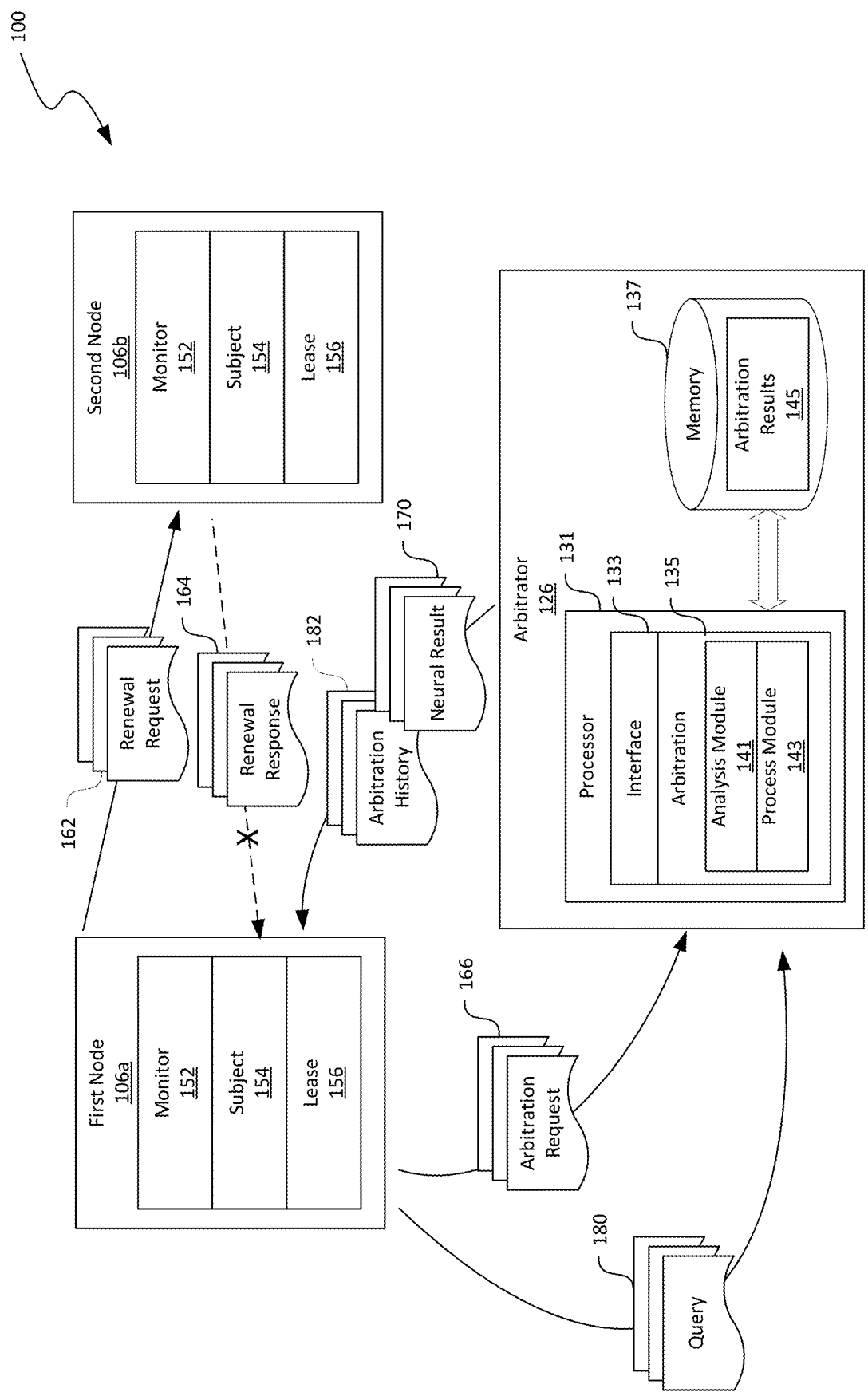
FIG. 6 is a block diagram illustrating two nodes in an implicit lease in accordance with embodiments of the disclosed technology.

FIG. 6 is a block diagram illustrating first and second nodes 106a and 106b in an implicit lease in accordance with embodiments of the disclosed technology. In accordance with several embodiments of the disclosed technology, each node 106 (FIG. 1) can have an "implicit lease" with one or more other nodes 106 acting as default monitor(s) for the node 106 and arbitrate when such an implicit lease expires, even though a formal lease (such as the one-way lease 161 shown in FIG. 3A or the two-way lease 165 shown in FIG. 4A) has never been successfully established. The implicit lease can be based on a logical relationship among pairs of the nodes 106 in the distributed computing system 100 of FIG. 1. As such, a node 106 can have implicit lease(s) with one or more immediate neighbors that can be any nodes 106 in the distributed computing system 100 and designated in various suitable ways. For example, in certain implementations, every node 106 can maintain implicit leases with a set of other nodes 106 selected by higher layer logic capable of handling dynamic node join and departure. The nodes 106 can form a logical ring based on, for instance, node identifications, node numbers, or other suitable parameters of the nodes. Thus, the set of other nodes 106 can simply include every node's immediate predecessor and successor in the logic ring. In other embodiments, the nodes 106 can also form a logic mesh, grid, or other suitable types of logical topology.

As such, every node 106 can detect whether one or more immediate neighbors are acting as a monitor node for itself. If such an implicit lease relationship has been inactive for a duration larger than an implicit threshold (TI), the node 106 can be configured to perform an implicit arbitration to obtain an approval to live from the arbitrator 126. For example, as shown in FIG. 6, if the first node 106a is not able to establish a lease relationship with its immediate neighbor, e.g., the second node 106b, the first node 106a can complete an arbitration once for every TI+AT (where AT is the arbitration timeout, expiration of which causes a requesting node to terminate) to obtain approval from the arbitrator 126 to continue to operate. The first node 106a can determine that the second node 106b is not acting as a monitor for the first node 106a by, for example, monitoring for any renewal response 164 (or absence thereof) from the second node 106b. In turn, the arbitrator 126 can issue a neutral arbitration result to the first node 106a. The first node 106a can report the second node 106b has failed if the second node 106b has not established the lease relationship with the first node 106b (or any other nodes 106) and the arbitrator 126 does not have an arbitration record from the second node 106b for such a period, as described in more detail below.

To achieve the above, a lease expiration time can be maintained on a node (e.g., the first node 106a) for an immediate neighbor (e.g., the second node 106b). Then, an elapsed time since last successful arbitration by, for example, the second node 106b can be determined. For instance, at t1, the first node 106a can send a query 180 to the arbitrator 126 requesting the arbitration history 182 associated with the second node 106b based on, for example, the arbitration results 145 in the memory 137. The arbitration history 182 can include a time value at which the second node 106b has completed an arbitration process with an arbitration result that is not negative, e.g., positive or neutral. The arbitrator 126 receives the query 180 at t2, and determines that the last such arbitration result was at t0. The arbitrator 126 can then respond with a value of t2−t0. At t3, the first node 106a receives the response from the arbitrator 126. Based on the received response, the first node 106a can determine whether the arbitrator 126 have any record for the second node 106b between t3−(t2−t0) to t1.

The first node 106a can maintain the last time the first node 106a has an active lease relationship as a subject node with its immediate neighbors (e.g., the second node 106b), for example, by recording a time when the last renewal response 164 is received from the second node 106b. When such an implicit lease is lost, i.e., no renewal response 164 has been received before a lease expiration period, this time can be set to the subject side lease expiration time. If the immediate neighbor (e.g., the second node 106b) switches to a different node (e.g., another node 106 in FIG. 1), and before the switch an active lease with a previous immediate neighbor (e.g., the second node 106b) is present, such a time can be set to the current time.

Once the first node 106a lost its implicit lease with an immediate neighbor, e.g., the second node 106b, the first node 106a can attempt to re-establish the lost lease within TI, which can be 5-10 minutes. If such an implicit lease with the second node 106b cannot be established within TI, the first node 106a can perform another arbitration for implicit lease to obtain an approval to continue to operate. The first node 106a can get a neutral or negative arbitration result. If the arbitration result is negative, the first node 106a is terminated. Otherwise, the first node 106a has a period of TI to retry establishing the implicit lease with the second node 106b. The arbitrator 126 can grant the arbitration request from the first node 106a without any history. Alternately, based on historical information for the requesting first node 106a and its immediate neighbor (e.g., the second node 106b), the arbitrator 126 can also decide to reject the arbitration request from the first node 106a.

The first node 106a can also query the arbitrator 126 to determine whether its immediate neighbor, e.g., the second node 106b, is down based on the following conditions:

There is no active lease relationship with the second node 106b either on the monitor side or on the subject side;

The second node 106b has become the immediate neighbor of the first node 106a for at least TI+(AT+MT)*2, where MT is the maximum lease timeout, during which first node 106a remains as the immediate neighbor of the first node 106a without interruption; and There has been at least an interval of AT since the monitor side lease with first node 106a expired.

Assuming that at time t1, the first node 106a sends the arbitrator 126 queries based on the above. According to the query, the second node 106b has not performed a successful arbitration started within (t0, t1−AT), where t0=t1−(TI+AT*2+MT). Based on the foregoing, the arbitrator 126 can declare that the second node 106b has failed and command the second node 106b to terminate.

Figure 7A:
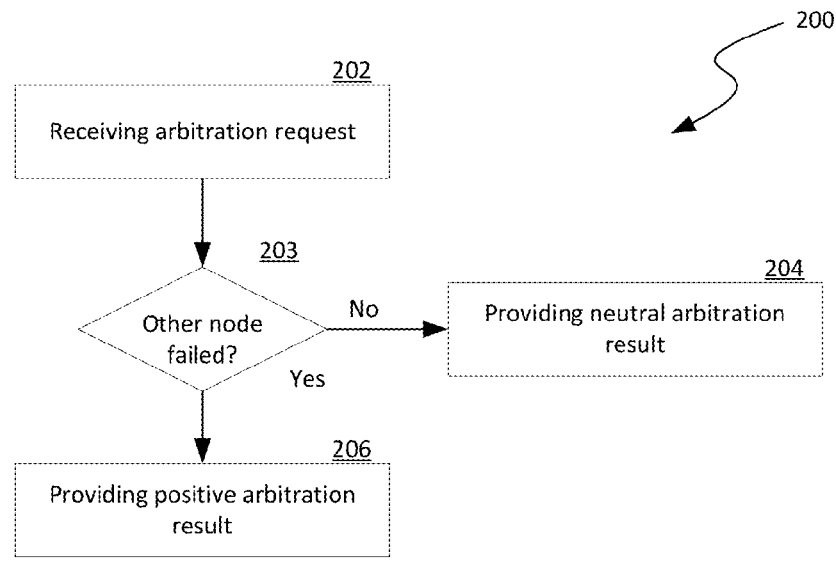
FIGS. 7A-7D are flowcharts illustrating a process of arbitrating a lease in accordance with embodiments of the disclosed technology.

FIG. 7A is a flowchart illustrating a process 200 of arbitrating a lease loss in accordance with embodiments of the disclosed technology. Even though the process 200 is described in relation to the distributed computing system 100 of FIG. 1, in other embodiments, the process 200 can also be implemented in other suitable systems. As shown in FIG. 7A, the process 200 includes receiving an arbitration request from a requesting node (e.g., a monitor node) at stage 202. The process 200 can then include a decision stage 203 to determine whether the other node of the lease (e.g., a subject node) of the lease has failed. In one embodiment, the other node can be declared as failed if an arbitration request from the other node is not received within a threshold period. In other embodiments, the other node can be declared as failed based on event logs, direct queries to the other node, or other suitable techniques. In response to determining that the other node has failed, the process 200 includes providing a positive arbitration result to the requesting node allowing the requesting node to continue to operate at stage 206. In response to determining that the other node has not failed, the process 200 include issuing a neutral arbitration result to both the requesting node and the other node allowing both the nodes to continue to operate at stage 204.

Figure 7B:
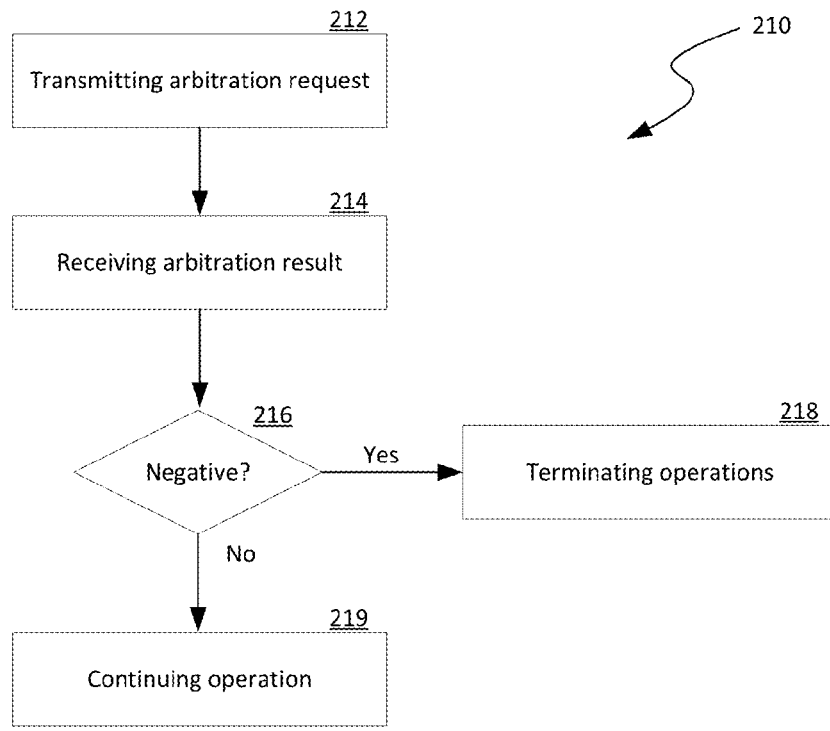

FIG. 7B is a flowchart illustrating a process 210 of arbitrating a lease loss by a node in accordance with embodiments of the disclosed technology. As shown in FIG. 7B, the process 210 includes transmitting an arbitration request upon detecting that a lease is lost at stage 212. The process 210 can then include receiving an arbitration result from an arbitrator at stage 214. The process 210 can include a decision stage 216 to determine whether the arbitration result is negative. In response to determining that the arbitration result is not negative, e.g., positive, neutral, or delay, the process 210 can include continuing operation at stage 219. In response to determining that the arbitration result is negative or an arbitration result is not received within a threshold period (e.g., an arbitration timeout), the process 210 includes terminating operations at stage 218.

Figure 7C:
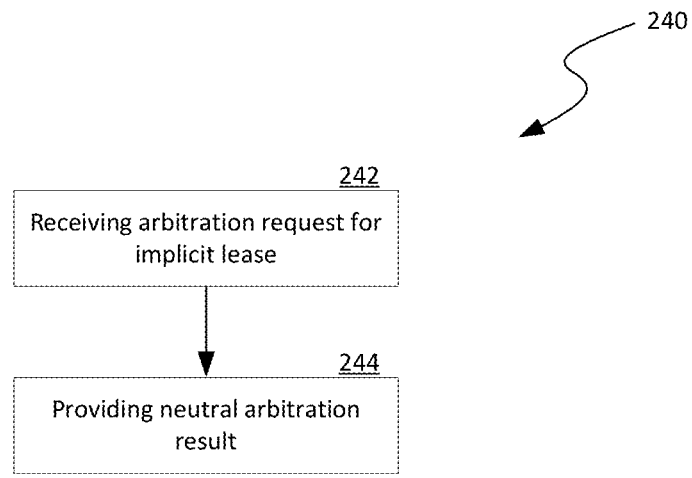

FIG. 7C is a flowchart illustrating a process 240 of arbitrating an implicit lease in accordance with embodiments of the disclosed technology. As shown in FIG. 7C, the process 240 can include receiving an arbitration request from a requesting node at stage 242. The arbitration request indicates that node is unable to establish a lease with another node for a predetermined threshold period. The other node is logically related to the requesting node according to a logic relationship and is a default monitor for the requesting node. The process 240 can then include in response to receiving the arbitration request from the requesting node, providing a neutral arbitration result to the requesting node within an arbitration timeout period. The neutral arbitration result allows the requesting node to continue to operate without causing the other node to terminate itself.

Figure 7D:
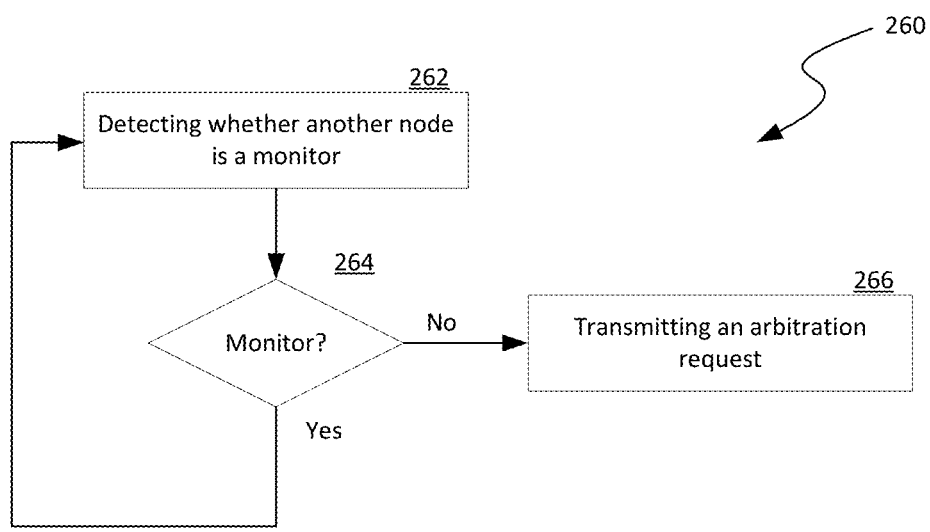

FIG. 7D is a flowchart illustrating a process 260 of arbitrating an implicit lease loss by a node in accordance with embodiments of the disclosed technology. As shown in FIG. 7D, the process 260 includes detecting whether another node is acting as a monitor for the node at stage 262, for example by monitoring an elapsed time since last renewal response from the other node. The process 260 can then include a decision stage 262 to determine whether the other node is not acting as the monitor for the node for a predetermined threshold period. In response to determining that the other node is acting as the monitor for the node, the process 260 reverts to detecting whether another node is acting as a monitor for the node at stage 262. In response to determining that the other node is not acting as a monitor for the predetermine threshold period, the process 260 includes transmitting an arbitration request to an arbitrator at stage 266.

Figure 8:
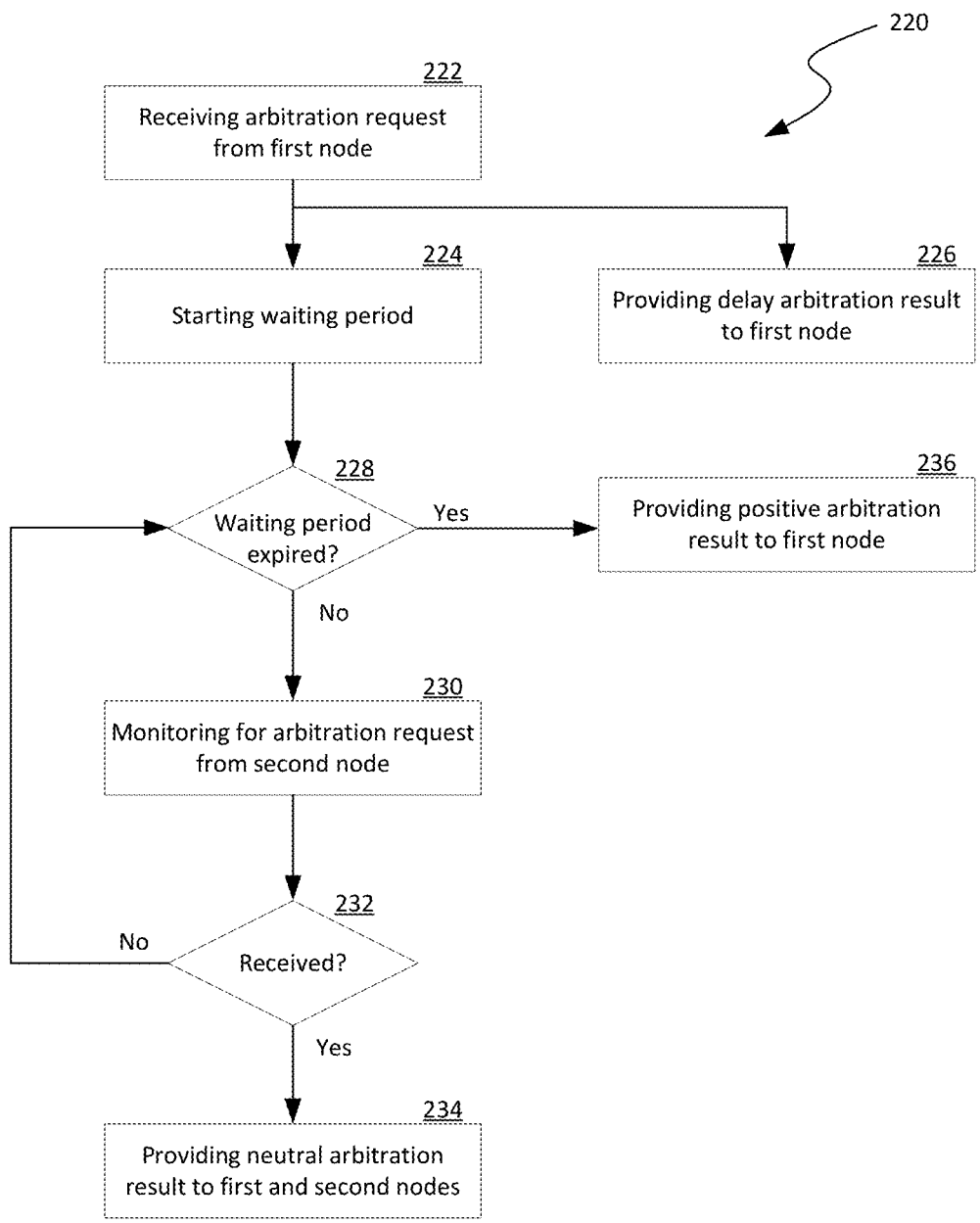
FIG. 8 is a flowchart illustrating a process of arbitrating a lease in accordance with additional embodiments of the disclosed technology.

FIG. 8 is a flowchart illustrating a process 220 of arbitrating a two-way lease in accordance with embodiments of the disclosed technology. As shown in FIG. 8, the process 220 can include receiving an arbitration request from a first node at stage 222. The arbitration request contends that a second node having a lease with the first node has failed. In the illustrated embodiment, the process 220 can then include starting a waiting period at stage 224 and providing a delay arbitration result to the first node at stage 226. The delay arbitration result neither grant nor reject the received arbitration request from the first node. Instead, the delay arbitration result allows the first node to continue to operate. In other embodiments, the arbitrator may also directly grant or reject the arbitration result from the first node based on, for example, arbitration history of the first node if the first node has been involved in lease loss before.

The process 220 can then include a decision stage 228 to determine whether the waiting period has expired. In response to determining that the waiting period has expired, the process 220 can include providing a positive arbitration result to the first node at stage 236. The positive arbitration result supersedes the neutral arbitration result previously issued to the first node. On the other hand, the second node would terminate itself if a neutral or positive arbitration result is not received.

In response to determining that the waiting period has not expired, the process 220 includes monitoring for another arbitration request from the second node. The process 220 can then include another decision stage 232 to determine whether another arbitration request has been received from the second node. In response to determining that another arbitration request has not been received from the second node, the process 220 reverts to decision stage 228 to determine whether the waiting period has expired. In response to determining that another arbitration request has been received from the second node, the process 220 includes providing a neutral arbitration result to both the first and second nodes at stage 234. As such, both the first and second nodes can be allowed to continue to operate.

FIG. 9 is a computing device 300 suitable for certain components of the distributed computing system 100 in FIG. 1. For example, the computing device 300 can be suitable for the nodes 106 or the arbitrator 126 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (pP), a microcontroller (pC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 9, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more AN ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

I claim:

1. A computing device, comprising:
a processor; and
a memory containing instructions executable by the processor to cause the computing device to:
receive an arbitration request from a first node in a computing system having a plurality of nodes interconnected by a computer network, the arbitration request indicating that a lease between the first node and a second node in the computing system has failed; and
in response to receiving the arbitration request from the first node, provide a delay arbitration result to the first node, the delay arbitration result allowing the first node to continue to operate;
while the first node continues to operate, determine whether the second node is operating normally; and
in response to determining that the second node is operating normally, provide a neutral arbitration result to both the first and second nodes, thereby allowing both the first and second node to continue to operate despite of the loss of the lease between the first and second nodes.

2. The computing device of claim 1 wherein the lease between the first node and the second node includes (i) a first subject-monitor relationship in which the first node is a monitor node and the second node is a subject node and (ii) a second subject-monitor relationship in which the first node is a subject node and the second node is a monitor node.

3. The computing device of claim 1 wherein to determine whether the second node is operating normally includes to determine whether another arbitration request is received from the second node within a predetermined period.

4. The computing device of claim 1 wherein to determine whether the second node is operating normally includes:
to determine whether another arbitration request is received from the second node within a predetermined period; and
in response to determining that another arbitration request is received from the second node within the predetermined period, to indicate that the second node is operating normally.

5. The computing device of claim 1 wherein to determine whether the second node is operating normally includes:
to determine whether another arbitration request is received from the second node within a predetermined period; and in response to determining that another arbitration request is not received from the second node within the predetermined period, to indicate that the second node is not operating normally.

6. The computing device of claim 1 wherein to determine whether the second node is operating normally includes:
to determine whether another arbitration request is received from the second node within a predetermined period; and
in response to determining that another arbitration request is not received from the second node within the predetermined period,
to indicate that the second node is not operating normally; and
to issue a negative arbitration result or no arbitration result to the second node, resulting in the second node terminating itself.

7. The computing device of claim 1 wherein to determine whether the second node is operating normally includes:
to determine whether another arbitration request is received from the second node within a predetermined period; and
in response to determining that another arbitration request is not received from the second node within the predetermined period,
to issue a negative arbitration result or no arbitration result to the second node, resulting in the second node terminating itself; and
to issue a positive arbitration result to the first node, resulting in the first node continue to operate.

8. The computing device of claim 1 wherein to determine whether the second node is operating normally includes:
to determine whether the second node is operating normally based on data in event logs associated with the first and second nodes; and
in response to determining that second node experiences frequent failures,
to issue a negative arbitration result or no arbitration result to the second node, resulting in the second node terminating itself; and
to issue a positive arbitration result to the first node, resulting in the first node continue to operate.

9. A method performed by a computing device in a computing system having a plurality of nodes interconnected by a computer network, comprising:
receiving a first arbitration request from a first node in the computing system, the first arbitration request indicating that a lease between the first node and a second node in the computing system has failed; and
in response to receiving the first arbitration request,
determining whether a second arbitration request is received from the second node within a predetermined period since receiving the first arbitration request; and
in response to determining that the second arbitration request is received from the second node within the predetermined period, providing a neutral arbitration result to both the first and second nodes, thereby allowing both the first and second nodes to continue to operate even though the lease between the first and second nodes has failed.

10. The method of claim 9, further comprising providing a delay arbitration result to the first node, the delay arbitration result allowing the first node to continue to operate without declaring the second node has failed.

11. The method of claim 9, further comprising:
providing a delay arbitration result to the first node, the delay arbitration result allowing the first node to continue to operate without declaring the second node has failed; and
wherein determining whether the second arbitration request is received includes determining whether the second arbitration request is received subsequent to providing the delay arbitration result to the first node.

12. The method of claim 9 wherein determining whether a second arbitration request is received from the second node includes:
initiating a timer having an expiration period equal to the predetermined period;
determining whether the timer has expired; and
in response to determining that the timer has not expired, monitoring for a second arbitration request from the second node.

13. The method of claim 9 wherein determining whether a second arbitration request is received from the second node includes:
initiating a timer having an expiration period equal to the predetermined period;
determining whether the timer has expired; and
in response to determining that the timer has expired, indicating that the second arbitration request is not received from the second node within the predetermined period.

14. The method of claim 9, further comprising:
in response to determining that the second arbitration request is not received from the second node within the predetermined period,
providing a positive arbitration result to the first node in response to the first arbitration request, the positive arbitration result allows the first node to continue to operate.

15. The method of claim 9, further comprising:
in response to determining that the second arbitration request is not received from the second node within the predetermined period,
providing a positive arbitration result to the first node in response to the first arbitration request, the positive arbitration result allows the first node to continue to operate; and
providing a negative arbitration result to the second node, the negative arbitration result causing the second node to terminate itself.

16. The method of claim 9, further comprising:
in response to determining that the second arbitration request is not received from the second node within the predetermined period,
providing a positive arbitration result to the first node, the positive arbitration result allows the first node to continue to operate; and
not providing any arbitration result to the second node, and thus causing the second node to terminate itself.

17. A method performed by a computing device in a computing system having a plurality of nodes interconnected by a computer network, comprising:
receiving, at an arbitrator, an arbitration request from a first node in the computing system, the first arbitration request indicating that a lease between the first node and a second node in the computing system has failed; and
in response to receiving the arbitration request from the first node, providing an arbitration result to the first node, the arbitration result allowing the first node to continue to operate without causing the second node to terminate even though the arbitration request from the first node arrives first at the arbitrator, thereby allowing both the first and second nodes to continue to operate even though the lease between the first and second nodes has failed.

18. The method of claim 17, further comprising:
receiving a keep-alive notification from the second node prior to receiving the arbitration request from the first node, the keep-alive notification indicating that the second node is operating normally; and
based on the received keep-alive notification from the second node, issuing a delay arbitration result instead of a positive arbitration result to the first node in response to receiving the arbitration request from the first node, the delay arbitration result allowing the first node to continue to operate without causing the second node to terminate itself.

19. The method of claim 17 wherein the first node is a monitor node, and wherein the second node is a subject node in the lease between the first and second nodes, and wherein providing the arbitration result includes issuing a neutral arbitration result to both the first and second nodes, the neutral arbitration result allowing both the first and second node to continue to operate.

20. The method of claim 16 wherein the first node is a monitor node, and wherein the second node is a subject node in the lease between the first and second nodes, and wherein providing the arbitration result to the first node includes:
providing a delay arbitration result to the first node; and
determining whether another arbitration request is received from the second node within a threshold period;
in response to determining that another arbitration request is received from the second node within the threshold period, issuing a neutral arbitration result to both the first and second nodes, the neutral arbitration result allowing both the first and second node to continue to operate.

* * * * *